US009026263B2

United States Patent
Hoshizaki

(10) Patent No.: US 9,026,263 B2
(45) Date of Patent: May 5, 2015

(54) AUTOMOTIVE NAVIGATION SYSTEM AND METHOD TO UTILIZE INTERNAL GEOMETRY OF SENSOR POSITION WITH RESPECT TO REAR WHEEL AXIS

(75) Inventor: Takayuki Hoshizaki, Irvine, CA (US)

(73) Assignee: Alpine Electronics, Inc., Tokyo (JP)

(*) Notice: Subject to any disclaimer, the term of this patent is extended or adjusted under 35 U.S.C. 154(b) by 142 days.

(21) Appl. No.: 13/307,399

(22) Filed: Nov. 30, 2011

(65) Prior Publication Data
US 2013/0138264 A1  May 30, 2013

(51) Int. Cl.
| G01C 21/12 | (2006.01) |
| G01C 21/16 | (2006.01) |
| G01C 21/26 | (2006.01) |
| G01C 21/28 | (2006.01) |
| B60G 17/019 | (2006.01) |
| G01C 21/00 | (2006.01) |

(52) U.S. Cl.
CPC ............ *G01C 21/165* (2013.01); *G01C 21/005* (2013.01); *G01C 21/12* (2013.01); *G01C 21/26* (2013.01); *G01C 21/16* (2013.01); *G01C 21/28* (2013.01); *B60G 17/019* (2013.01)

(58) Field of Classification Search
USPC ......... 342/357.23, 357.64, 357.31; 701/1, 25, 701/28, 301, 31.4, 36, 38, 41, 42, 46, 444, 701/469, 470, 472, 478.5, 480, 50, 500, 701/501, 507, 51, 510, 523, 532, 533, 70; 340/441, 932.2; 702/94, 95; 73/1.37, 73/146
See application file for complete search history.

(56) References Cited

U.S. PATENT DOCUMENTS

| 6,634,109 | B1* | 10/2003 | Dale et al. ........................ 33/203 |
| 6,789,014 | B1* | 9/2004 | Rekow et al. .................... 701/25 |
| 6,859,727 | B2 | 2/2005 | Bye et al. |
| 7,010,968 | B2* | 3/2006 | Stewart et al. .................. 73/146 |
| 7,957,898 | B2 | 6/2011 | Hoshizaki et al. |
| 2006/0052926 | A1* | 3/2006 | Okada et al. .................... 701/51 |
| 2006/0055521 | A1* | 3/2006 | Blanco et al. ................. 340/441 |
| 2006/0271278 | A1* | 11/2006 | Sakakibara et al. .......... 701/207 |
| 2007/0057816 | A1* | 3/2007 | Sakakibara et al. ....... 340/932.2 |
| 2008/0091351 | A1* | 4/2008 | Hoshizaki ..................... 701/214 |
| 2008/0147280 | A1* | 6/2008 | Breed ............................. 701/46 |
| 2008/0208501 | A1* | 8/2008 | Fiedler et al. ................... 702/95 |

(Continued)

OTHER PUBLICATIONS

Genta, G., "Motor Vehicle Dynamics Modeling and Simulation" World Scientific Publishing Co., /Ltd. 1997, 5, Singapore, pp. 206-207.

(Continued)

*Primary Examiner* — Fadey Jabr
*Assistant Examiner* — Kevin P Mahne
(74) *Attorney, Agent, or Firm* — Muramatsu & Associates

(57) ABSTRACT

A navigation system and method to utilize the internal geometry of the sensor position with respect to the vehicle's rear-wheel axis for maintaining high positioning accuracy even when GPS signals are lost for a long period of time are disclosed. One aspect is to use an analytical condition derived from a vehicle's mechanical condition so-called Ackermann Steering Geometry for enhancement in navigation accuracy. The analytical condition is a relationship between the vehicle's lateral directional velocity, the distance of the sensor position with respect to the rear wheel axis, and the angular rate with respect to the vehicle's z-axis. Another aspect is to incorporate the distance of the sensor position with respect to the rear wheel axis into the INS and Kalman filter's states as an auxiliary parameter.

16 Claims, 22 Drawing Sheets

(56) References Cited

U.S. PATENT DOCUMENTS

| | | | |
|---|---|---|---|
| 2008/0319670 A1* | 12/2008 | Yopp et al. | 701/301 |
| 2009/0271108 A1* | 10/2009 | Kobori et al. | 701/208 |
| 2010/0019963 A1* | 1/2010 | Gao et al. | 342/357.04 |
| 2010/0049439 A1* | 2/2010 | Cho et al. | 701/216 |
| 2010/0292915 A1* | 11/2010 | Ishigami et al. | 701/200 |
| 2011/0015817 A1* | 1/2011 | Reeve | 701/25 |
| 2011/0130926 A1* | 6/2011 | Lu et al. | 701/42 |
| 2011/0153156 A1* | 6/2011 | Haller et al. | 701/36 |
| 2011/0160963 A1* | 6/2011 | Yasui et al. | 701/41 |

OTHER PUBLICATIONS

Gelb, A., Applied Optimal Estimation, The M.I.T. Press, 1974, Cambridge, MA, pp. 190-191.

* cited by examiner

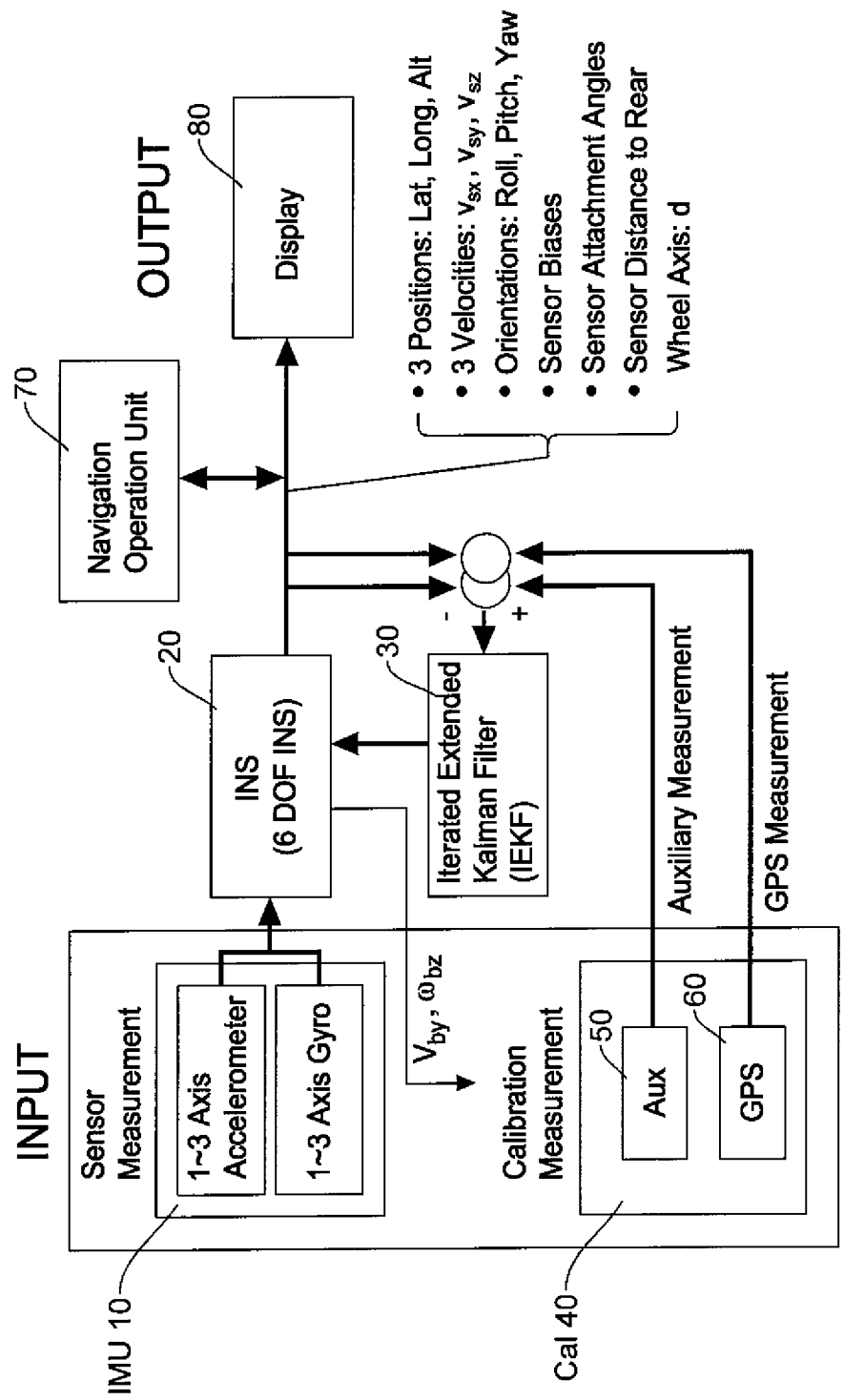

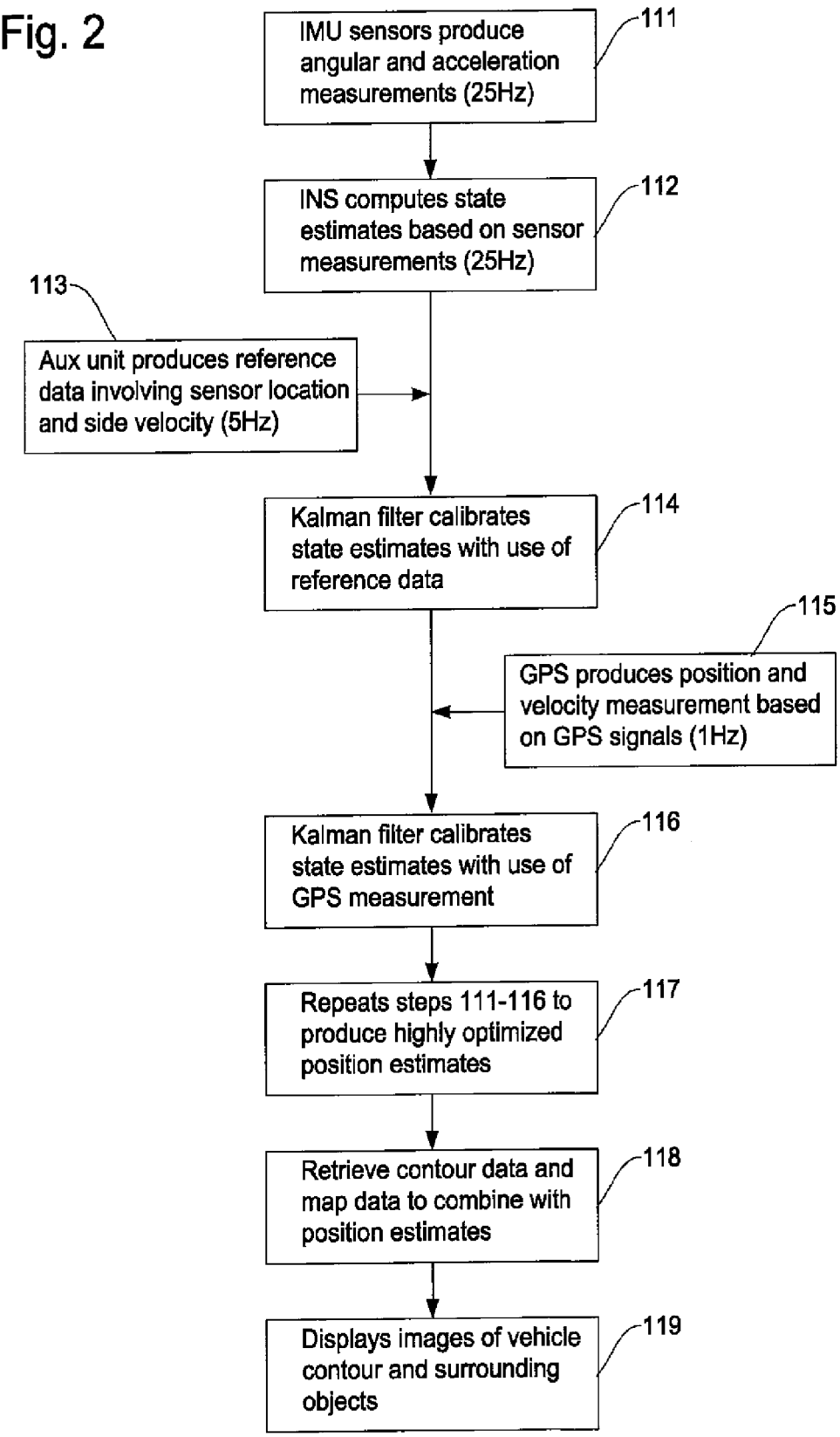

Sensor Fixed Coordinate System

Vehicle Body Fixed Coordinate System

Top View Bird View

Ackermann Steering Geometry

Center of Cornering

Navigation System Motion Direction

Navigation System      Center of Cornering

Theoretical Lateral Velocity $v_{by} = d\omega_{bz}$

Theoretical Lateral Velocity:
Special Case of d = 0

$v_{by} = 0$

Theoretical Lateral Velocity:
Special Case of d = 0

$$\overline{v_{by}} = 0$$

Place Sensor IMU at
Bottom-Center inside Trunk

Spiral Trajectory through 3D Parking Garage
(Magnified View)

Backing Distance (1)-(3)

Spiral Trajectory through 3D Parking Garage
(Magnified View)

Backing Distance (1)-(3)

Display Surrounding Objects with Vehicle Contour and Navigation System Position with Proper Internal Geometry Estimated Automatically

AUTOMOTIVE NAVIGATION SYSTEM AND METHOD TO UTILIZE INTERNAL GEOMETRY OF SENSOR POSITION WITH RESPECT TO REAR WHEEL AXIS

FIELD

Embodiments disclosed here relate to a method involving a vehicle navigation system, and more particularly, to a navigation method and system utilizing the internal geometry of the sensor position with respect to the vehicle's rear-wheel axis for maintaining high positioning accuracy even when GPS signals are lost for a long period of time.

BACKGROUND

The inertial navigation system (INS) is a widely used technology for guidance and navigation. The INS is composed of an inertial measurement unit (IMU) and a processor wherein an IMU contains accelerometers and gyroscopes which are inertial sensors detecting platform motion with respect to an inertial coordinate system. An important advantage of the INS is independence from external support, such as positional signals from artificial satellites, however, it cannot maintain high accuracy for long distance by itself because of accumulating sensor errors over time.

More recent development in global positioning system (GPS) has enabled low-cost navigation without growing error. The GPS, however, involves occasional large multipath errors in urban canyons (i.e., urban areas surrounded by high rise buildings) and signal dropouts inside buildings or tunnels. Therefore, efforts have been made to develop integrated INS/GPS navigation systems by combining the GPS and INS using a Kalman filter algorithm to remedy the performance problems in both systems.

Inertial sensors (accelerometers and gyroscopes) for an IMU used to be expensive and large, thus only used in high precision applications, for example, aerospace and military navigation. To establish an IMU with compact packaging and an inexpensive manner, efforts have been made to develop micro-electro mechanical system (MEMS) sensors, resulting in commercialization of low-cost and small inertial sensors. However, MEMS sensors involve large bias and noise. Low cost MEMS sensors have been largely adopted by cost sensitive navigation products such as automotive and portable navigation systems. In integrated MEMS IMU/GPS navigation systems, however, errors quickly accumulate into a large amount as soon as GPS signals drop out due to buildings, tunnels, etc.

Bye et al. suggested, in U.S. Pat. No. 6,859,727 entitled "ATTITUDE CHANGE KALMAN FILTER MEASUREMENT APPARATUS AND METHOD", in Col. 4, lines 61-62, a Kalman filter based calibration method as "for a non-rotating IMU, the externally observed attitude or heading change (at the aiding source) is taken to be zero". When this concept is applied as a condition of zero side velocity of a ground vehicle, divergent navigation solutions due to erroneous MEMS sensors are largely improved to be non-divergent solutions with reasonable positioning accuracy. However, as discovered by the inventor of this application, vehicle's side velocity has an analytical non-zero term. Suppressing the non-zero velocity into zero will cause unfavorable side effects such as a shortage of the total velocity and erroneous increment of pitch angle estimate, which results in a large positioning error when GPS signals are lost.

Therefore, there is a need for a new navigation system and method using low-cost MEMS IMU with capability of maintaining high accuracy even when GPS is lost for a long period of time by evaluating not only constant values but also non-constant and non-zero analytical conditions.

SUMMARY

It is, therefore, an object of disclosure to provide an embodiment which is an integrated INS/GPS navigation system and method incorporating low-cost MEMS in an IMU (inertial measurement unit) to utilize the internal geometry of the sensor position with respect to the vehicle's rear-wheel axis for maintaining high positioning accuracy even when GPS signals are lost for a long period of time.

One aspect of the embodiment is that the proposed navigation method uses an analytical condition derived from a vehicle's mechanical condition so-called Ackermann Steering Geometry (see Genta, G., "MOTOR VEHICLE DYNAMICS Modeling and Simulation", World Scientific Publishing Co. Pte. Ltd., 1997, 5 Toh Tuck Link, Singapore, pp. 206-207) for enhancement in navigation accuracy. The analytical condition is a relationship between the vehicle's lateral directional velocity, the distance of the sensor position with respect to the rear wheel axis, and the angular rate with respect to the vehicle's z-axis.

Another aspect of the embodiment is a Kalman filter based navigation method to utilize the aforementioned analytical condition by incorporating the distance of the sensor position with respect to the rear wheel axis into the Kalman filter's states as an auxiliary parameter so that the system can automatically estimate the distance between the sensor position and the rear wheel axis without need of manually measuring the distance upon installation of the navigation system.

Another aspect of the embodiment is the Kalman filter based navigation method to continuously utilize the aforementioned analytical condition as an auxiliary measurement at a high frequency executed independently of GPS measurement.

Another aspect of the embodiment is that the system with zero distance of the sensor position with respect to the rear-wheel axis will achieve the highest positioning accuracy, thus such sensor position is suggested as "the best sensor position" for automotive navigation. This is because the analytical condition reduces to "zero lateral velocity" without need of evaluating gyro outputs including bias estimates. The system with the best sensor position is practically achieved by placing a sensor IMU at the bottom-center of the rear trunk which is approximately above the center of the rear wheel axis for majority of vehicles.

Another aspect of the embodiment is to show a vehicle contour image and the navigation system's position on a display with proper geometry between the vehicle contour and navigation system's position in which the distance between the navigation system and the rear wheel axis is automatically estimated.

Another aspect of the embodiments is to align the navigation system's absolute position (latitude and longitude) with respect to objects surrounding the vehicle by placing the GPS antenna above the navigation system in which the distance between the navigation system and the rear wheel axis is automatically estimated.

According to the embodiments: (1) regardless of the sensor position, the distance of the sensor position with respect to the rear wheel axis will be automatically estimated without need of measuring the distance by hand, which will be utilized to enhance navigation accuracy; (2) high positioning accuracy is maintained even when GPS signals are lost for a long period of time using a low-cost MEMS IMU; (3) the best sensor position to achieve the highest navigation accuracy is the center of the rear-wheel axis which is practically available by placing a sensor IMU at the bottom-center of the trunk; (4) a driver's safety consciousness is enhanced by the visual aid from the display showing the vehicle contour with proper geometry with respect to the navigation system as well as to the surrounding objects.

BRIEF DESCRIPTION OF THE DRAWINGS

FIG. 1A is a block diagram showing an example of comprehensive system architecture of an embodiment of the new integrated INS/GPS navigation system with the input-output relationship.

FIG. 2 is a flowchart showing an example of operational steps according to the preferred embodiment of the integrated INS/GPS navigation system and method described with reference to FIGS. 1A-1E.

FIG. 11A is a top view and FIG. 11B is a bird view, respectively, of the trajectories of the vehicle carrying the embodiment of the integrated INS/GPS navigation system.

FIG. 12A is a top view and FIG. 12B is a bird view, respectively, of the trajectories of the vehicle.

FIG. 13A shows velocity components in the vehicle body fixed axes estimated by the embodiment of the integrated INS/GPS navigation system, FIG. 13B shows velocity components in the vehicle body fixed axes estimated by the conventional technology, and FIG. 13C shows the difference between the data of FIG. 13A and the data of FIG. 13B.

FIG. 14A shows the vehicle pitch angle estimated by the embodiment of the integrated INS/GPS navigation system, FIG. 14B shows the vehicle pitch angle estimated by the conventional technology, and FIG. 14C shows the difference between the data of FIG. 14A and the data of FIG. 14B.

FIG. 15A shows a magnified view of FIG. 1B around the vehicle's backing motion in the top floor of the garage, and FIG. 15B shows a magnified view of FIG. 12B around the vehicle's backing motion in the top floor of the garage.

FIG. 18A shows the time history of estimated sensor position with respect to the vehicle's rear wheel axis and FIG. 18B shows the time history of the sigma value of the estimate in FIG. 18A.

DETAILED DESCRIPTION OF THE PREFERRED EMBODIMENTS

Various embodiments will be described in detail with reference to the accompanying drawings. The embodiments described here are related to an integrated INS/GPS navigation system and method incorporating low-cost micro-electro mechanical system (MEMS) sensors in an IMU (inertial measurement unit) to utilize the internal geometry of the sensor position with respect to the vehicle's rear-wheel axis for maintaining high positioning accuracy even when GPS signals are lost for a long period of time.

Figure 1B:
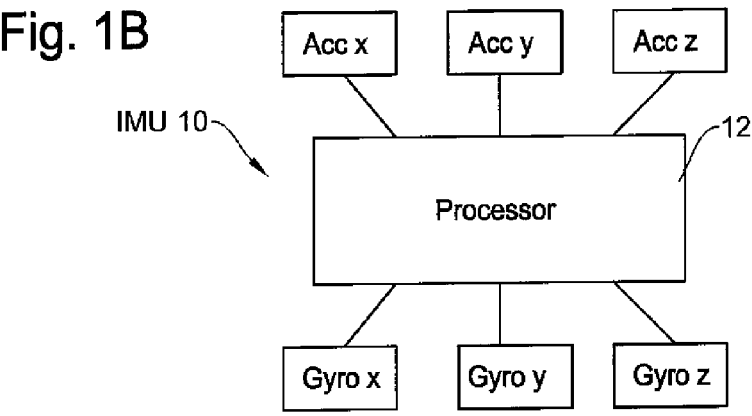
FIG. 1B is a schematic diagram showing an example of an IMU (inertial measurement unit) with low-cost MEMS sensors.
Figure 1C:
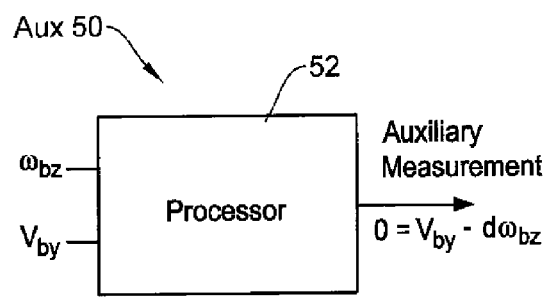
FIG. 1C is a schematic diagram showing an example of an auxiliary measurement unit.
Figure 1D:
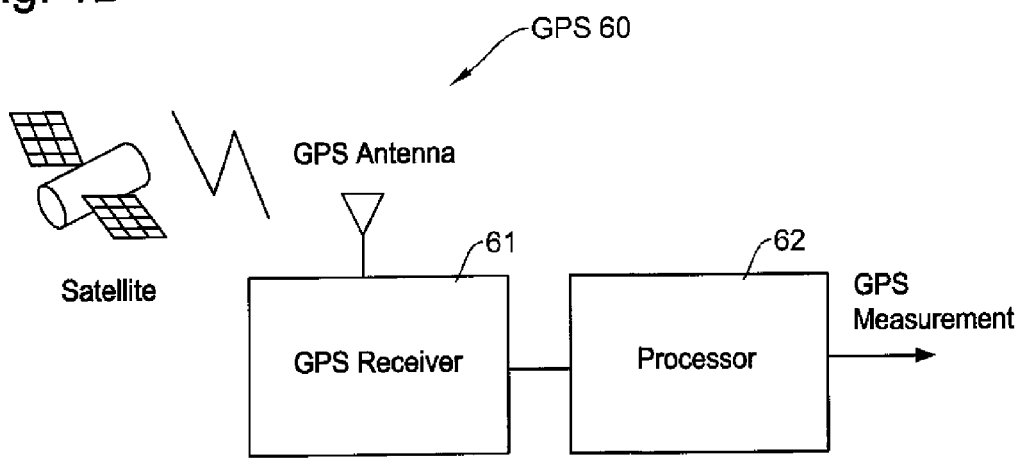
FIG. 1D is a schematic diagram showing an example of structure of a GPS measurement unit.
Figure 1E:
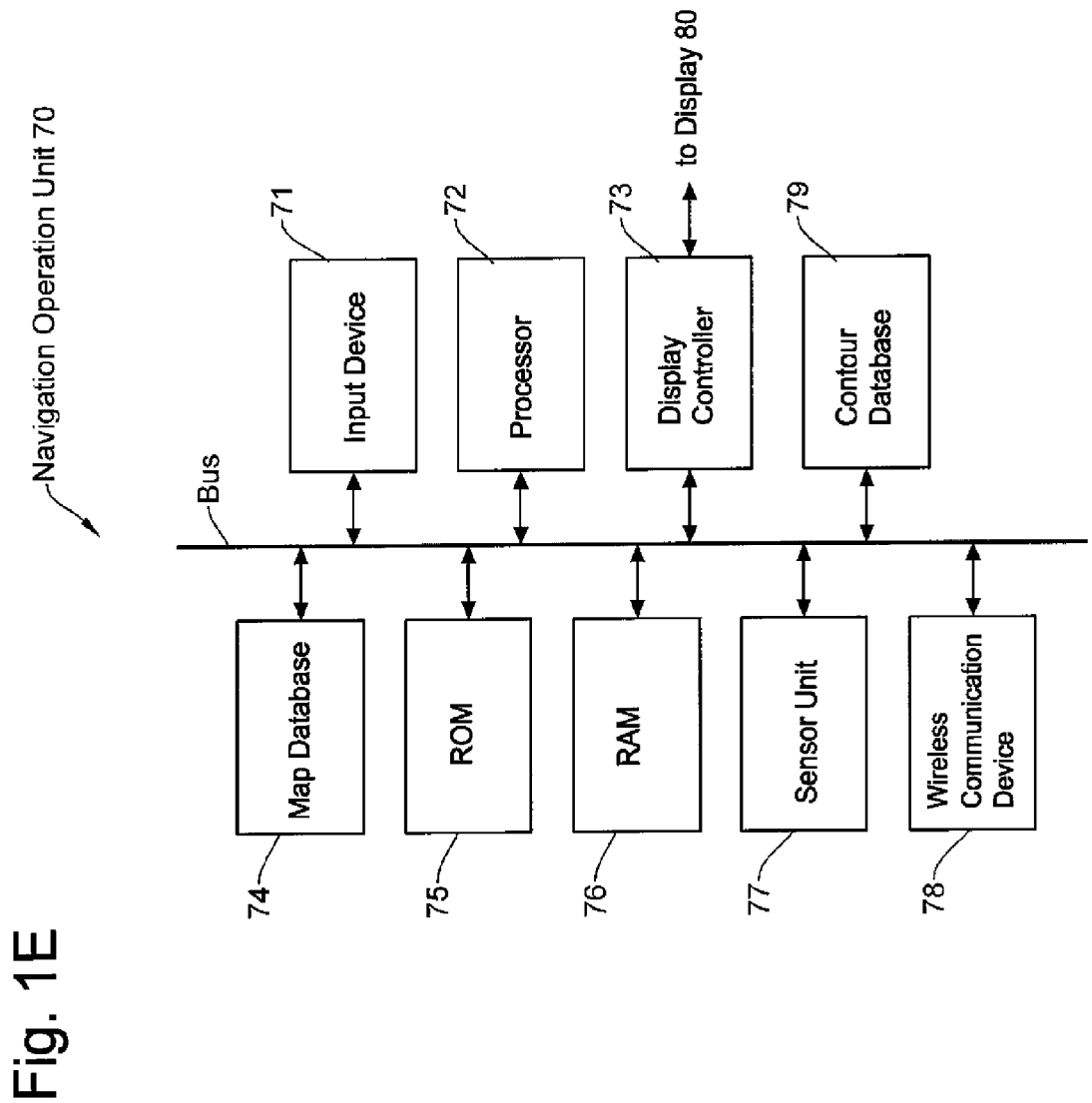
FIG. 1E is a block diagram showing an example of structure in a navigation operation unit.

FIGS. 1A-1E show examples of structure related to the embodiments of the integrated INS/GPS navigation system and method. FIG. 1A is a block diagram showing an example of comprehensive system architecture of the embodiment of the integrated INS/GPS navigation system with the input-output relationship, FIG. 1B is a schematic diagram showing an example of structure of an IMU (inertial measurement unit) with low-cost MEMS sensors, FIG. 1C is a schematic diagram showing an example of structure of an auxiliary measurement unit, FIG. 1D is a schematic diagram showing an example of structure of a GPS measurement unit, and FIG. 1E is a block diagram showing an example of structure of a navigation operation unit.

With reference to FIG. 1A, the integrated INS/GPS navigation system includes an IMU (inertial measurement unit) 10 containing MEMS inertial sensors of a three-axis accelerometer and three-axis gyro, an inertial navigation system (INS) computational unit 20, an iterated extended Kalman filter (IEKF) unit 30, a calibration unit (Cal) 40 having an auxiliary measurement unit (Aux) 50 and a global positioning system (GPS) unit 60, a navigation operation unit 70, and a display 80. In the example of FIG. 1A, the IMU 10 and the Cal 40 are configured to input various parameters, the INS 20, the IEKF 30 and the navigation operation unit 70 are configured to process the input parameters to produce state estimates of the vehicle including position estimates, and the display 80 is configured to output the resultant position estimates, etc.

The IMU 10 measures vehicle's accelerations and angular rates. In the example of FIG. 1B, the IMU 10 includes a processor 12, and the inertial sensors consisting of three (three-axis) accelerometers Acc x-z and three (three-axis) gyroscopes Gyro x-z. The accelerometers Acc x-z detect accelerations in the three (X,Y,Z) coordinates with respect to the sensor fixed coordinate system described in FIG. 3, and the gyroscopes Gyro x-z detect angular rates about the three (X,Y,Z) coordinates with respect to the sensor fixed coordinate system described in FIG. 3. As noted above, the inertial sensors are established by low-cost MEMS (micro-electro mechanical system) sensors. The processor 12 calculates the accelerations and angular rates of the vehicle based on the measured signals from the inertial sensors Acc x-z and Gyro x-z. The IMU 10 produces the measured data at a rate of, for example, 25 times per second (25 Hz), which is supplied to the INS 20.

The INS 20 is, for example, so called a Six Degrees of Freedom (6DOF) INS which executes the INS computation to update navigation state estimates (position, velocity, orientation, and sensor bias) and their covariances, i.e., uncertainties of estimates, upon the sensor measurement. The INS 20 updates the navigation state estimates at a rate of, for example, 25 times per second (25 Hz). The navigation state estimates are periodically calibrated by a Kalman filter, for example, Iterated Extended Kalman Filter (IEKF) 30 shown in FIG. 1A. Basic structure and operation of an INS and a Kalman filter will be described in detail with mathematical equations in the later sections of "INS Technology" and "Kalman Filter Technology".

The Aux (auxiliary measurement unit) 50 is unique to the embodiments of the integrated INS/GPS navigation system and method. Typically, the Aux 50 is configured by a processor as shown in FIG. 1C to conduct an operation prescribed by a program. More specifically, the Aux 50 produces the auxiliary measurement data (reference data) involving a distance (d) between the navigation system (ex. inertial sensors of IMU) and a vehicle's rear wheel axis. In the example of FIG. 1C, based on vehicle side velocity $v_{by}$ and vehicle's z-axis angular rate $\omega_{bz}$ from the INS 20 as shown in FIG. 1A, the Aux 50 produces the auxiliary measurement data which is expressed by $0=v_{by}-d\omega_{bz}$. The auxiliary measurement data (reference data) will be described in more detail later with respect to the vehicle side velocity in the description of analytical conditions. The Aux 50 sends the auxiliary measurement data to the Kalman filter 30 at a rate of, for example, 5 times per second (5 Hz).

In the example of FIG. 1D, the GPS 60 is configured by a GPS antenna, a GPS receiver 60, and a processor 62. Through the GPS antenna, the GPS receiver 61 receives GPS signals from a plurality of artificial satellites, and the processor 62 calculates the estimated location of the vehicle by comparing clock signals and position data included in the GPS signals. More specifically, the GPS 60 measures the GPS antenna position and velocity based on range and range-rate information between the GPS antenna and multiple satellites in the field of view to send the measurements to the Kalman filter 30. Typically, the GPS 60 produces the position and velocity data every one second (1 Hz).

The state estimates from the INS 20, the measurement data from the GPS 60, and the auxiliary measurement data from the Aux 50 are combined by the Kalman filter 30 which optimally estimates, in real time, the states of the navigation system based on such noisy measurement data. Namely, the navigation state estimates from the INS 20 are periodically calibrated by the Kalman filter 30 by taking the differences between the INS state estimates and the calibration measurements (auxiliary measurement and GPS measurement) obtained from the Aux 50 and the GPS 60, respectively. As noted above, the auxiliary measurement from the Aux 50 involves the analytical condition which is the relationship between the vehicle's lateral directional (side) velocity, the distance of the sensor position with respect to the rear wheel axis, and the angular rate with respect to the vehicle's z-axis. By incorporating this analytical condition in the calibration process by the Kalman filter 30, a positioning error caused by the vehicle side velocity can be canceled or minimized, a theory of which is described later.

The integrated INS/GPS navigation system of FIG. 1A estimates the following parameters: three position parameters (latitude, longitude, and altitude), three velocity parameters (velocities along the sensor fixed x, y, and z-axes), three orientation parameters (roll, pitch, and yaw angles of the sensor fixed coordinate system with respect to the North-East-Down coordinate system), six sensor biases (accelerometers and gyro biases along the sensor fixed x, y, and z-axes, respectively), two sensor attachment angles (pitch and yaw angles with respect to the vehicle body fixed coordinate system), and the position of the sensor IMU with respect to the vehicle's rear wheel axis.

In one embodiment, the position information including latitude, longitude, altitude, and the position of the sensor IMU with respect to the rear wheel axis will be used to display the vehicle contour and the navigation system with proper geometry between the navigation system's position and the vehicle contour on the display 80 in which the distance between the navigation system and the rear wheel axis is automatically estimated by the navigation system. The navigation system's absolute position (latitude, longitude, (and altitude if necessary)) and position information from a map database are aligned by placing the GPS antenna above the navigation system.

The navigation operation unit 70 is provided to conduct an overall operation of the navigation system for specifying a destination, searching and calculating an optimum route to the destination, conducting the route guidance operation to the destination, displaying a vehicle contour image with respect to images of surrounding objects, etc. In the example of FIG. 1E, the navigation operation unit 70 includes an input device 71 for selecting a menu, specifying a destination, executing a command, etc., a processor 72 for controlling an overall operation of the navigation system, and a display controller 73 for controlling the operation of the display 80. The input device 71 can be various hard keys, a touch screen formed on the display 80, a remote controller, a voice interface, etc.

In the block diagram of FIG. 1E, the navigation operation unit 70 further includes a map database (data storage device) 74 such as a hard disc, CD-ROM, DVD, flash memory, etc., for storing the map data (position data of links, nodes, polygons, etc.), a ROM 75 for storing various programs for navigation operations, and a RAM 76 for storing operational data or a processing result such as a guidance route. The map data is used to calculate a route to the destination, to produce a map image on the navigation screen such as on the display 80, and to provide various information on points of interest (POI), etc. An example of programs stored in ROM 75 includes a route search program to search and calculate possible routes to the destination, and a map matching program for matching the position estimates from the INS 20 with link, node and polygon data from the map database.

In FIG. 1E, the navigation operation unit 70 further includes a sensor unit 77 for detecting distances form other vehicles, pedestrians, structures, etc., a wireless communication device 78 for wireless communication with a remote server such as a traffic information server, a local event server, an internet server, a social network server, etc., and a contour database 79 for storing information on the vehicle contour. The sensor unit 77 may be configured by a plurality of radar sensors, cameras, etc. to measure shapes and distances from the outer objects. The vehicle contour data for the contour database 79 may be available from vehicle manufacturers or from data books in the industry. The vehicle contour data is used for showing images on the display 80 so that the user can easily comprehend the relationship among the vehicle contour, a location of the navigation system in the vehicle, and the objects surrounding the vehicle.

FIG. 2 is a flowchart showing an example of process in the integrated INS/GPS navigation system and method involving the preferred embodiment of FIGS. 1A-1E. At step 111, the IMU sensor measures vehicle three-axis accelerations and three-axis angular rates. This step is conducted by the IMU 10 having the accelerometers x-z and gyroscopes x-z shown in FIGS. 1A and 1B. As noted above, this step is conducted at a relatively high frequency, e.g., 25 Hz. The measured accelerations and angular rates are sent to the INS (inertial navigation system) in step 112 to update the navigation state estimates (position, velocity, orientation, and sensor bias) and their covariances. An example of INS is a "Six Degrees of Freedom (6DOF) INS" as indicated by the INS 20 in FIG. 1A. As also noted above, this step is conducted at relatively high frequency, for example, 25 Hz.

At step 113, the Aux (auxiliary measurement unit) 50 shown in FIGS. 1A and 1C produces the auxiliary measurement data (reference data) involving a distance (d) between the navigation system (ex. inertial sensors of IMU) and a vehicle's rear wheel axis and a vehicle side velocity. More specifically, based on the vehicle side velocity $v_{by}$ and the vehicle's z-axis angular rate $\omega_{bz}$, the Aux 50 produces the auxiliary measurement data expressed by, for example, $0=v_{by}-d\omega_{bz}$, which is sent to the Kalman filter 30 at a rate of, for example, 5 Hz.

The parameters from the INS are periodically calibrated at lower frequencies in step 114 according to the IEKF (iterated extended Kalman filter) technology by incorporating the auxiliary measurement data (reference data) from the Auxiliary measurement unit. In the example of FIG. 1A, this process is conducted by the Kalman filter 30 which receives the state estimates from the INS 20 and the auxiliary measurement data from the Aux 50.

At step 115, the process incorporates the GPS measurements. In the example of Figure D, the GPS (GPS Measurement Unit) 60 receives GPS signals from a plurality of artificial satellites and calculates the estimated position and velocity of the vehicle by comparing clock signals and position data included in the GPS signals. Typically, the GPS 60 produces the position and velocity data every one second (1 Hz), which is sent to the Kalman filter 30 as shown in FIG. 1A.

In step 116, the navigation state estimates (position, velocity, orientation, and sensor bias) from the INS 20 are calibrated by the Kalman filter 30 by taking the differences between the INS state estimates and the GPS measurements obtained from the GPS 60.

At step 117, the process repeats the above steps 111-116 as an integrated INS/GPS navigation system to continuously optimize the navigation position estimates. The GPS signals may not be available for a long period of time if a vehicle is in a tunnel, building, or valley of high-rise buildings, thus in such a case, the calibration data based on the GPS measurement cannot be used by the Kalman filter 30. Even in such a situation, the integrated INS/GPS navigation system and method disclosed here is able to maintain the high positioning accuracy since it utilizes the auxiliary measurement data from the Aux 50 to minimize the position error associated with the vehicle side velocity.

In step 118, the process combines the optimized position estimates obtained in the foregoing steps with the position information retrieved from the map database and the vehicle contour data. This process is conducted to match the optimized position estimates of the navigation system in the vehicle with the objects surrounding the vehicle and the vehicle contour. In the example of FIGS. 1A and 1E, this step is conducted by the navigation operation unit 70 which includes the map database 74 and the contour database 79.

In step 119, the navigation system displays the vehicle contour and the position of the navigation system in the vehicle with proper geometry between the navigation system's position and the vehicle contour. As noted above, based on the auxiliary measurement data (reference data) produced by the Aux 50, the distance between the navigation system and the rear wheel axis is automatically estimated by the navigation system. The navigation system's absolute position (latitude, longitude, (and altitude if necessary)) and the surrounding objects produced from the map database are aligned by placing the GPS antenna above the navigation system.

Based upon the system architecture and flowchart discussed so far, descriptions will be made regarding the detailed and theoretical navigation method to utilize the internal geometry of the sensor position with respect to the rear wheel axis for navigation accuracy enhancement. As preparation, brief explanation is present regarding the three major coordinate systems that the embodiments of the integrated INS/GPS navigation system will use in the following theoretical description.

Figure 3:
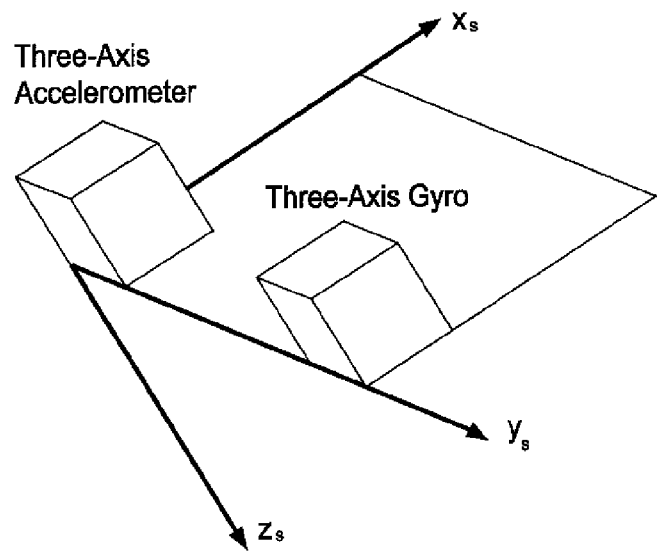
FIG. 3 is a schematic diagram that defines a sensor fixed coordinate system related to the preferred embodiment.

FIG. 3 defines the sensor fixed coordinate system in which each of x, y, and z-axis represents a sensor's sensitive direction. A parameter with respect to the sensor coordinate system is indicated by a subscript of "s".

Figure 4:
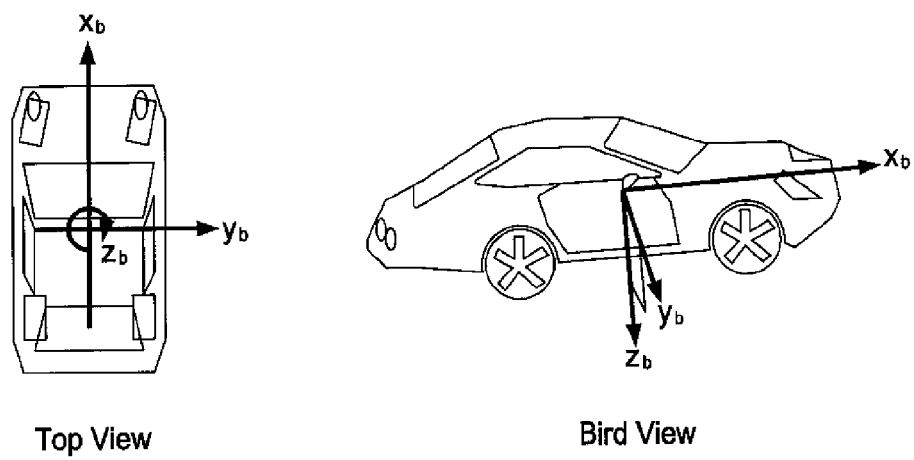
FIG. 4 is a schematic diagram that defines a vehicle body fixed coordinate system related to the preferred embodiment.

FIG. 4 defines the vehicle body fixed coordinate system with a top view and a bird view in which the x-axis is defined toward the vehicle's forward direction, the y-axis is defined toward the vehicle's right-hand direction, and the z-axis is defined in the vehicle's downward direction from the ceiling to floor. A parameter with respect to the vehicle body fixed coordinate system is indicated by a subscript of "b". The direction of the $z_b$-axis in the top view is represented by "the forward rotation of a right screw", which is a common notation in physics. In other words, the clockwise rotation represents that we see the rear view of an arrow; the counterclockwise rotation represents that we see the front view of an arrow.

Figure 5:
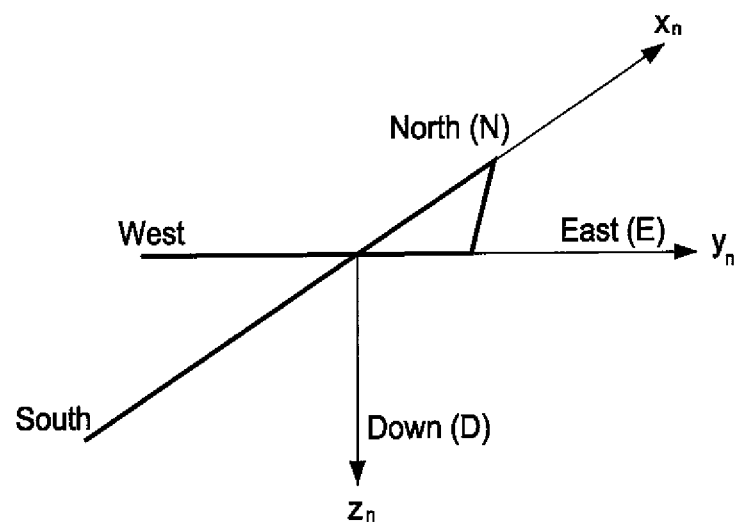
FIG. 5 is a schematic diagram that defines a North-East-Down (NED) coordinate system related to the preferred embodiment.

FIG. 5 defines the North-East-Down (NED) coordinate system in which the x-axis is defined in the northerly direction, the y-axis is defined in the easterly direction, and the z-axis is defined in the vertically downward direction. A parameter with respect to the NED coordinate system is indicated by a subscript of "n".

Analytical Condition

Here, the analytical condition incorporated in the embodiments of the integrated INS/GPS navigation system and method is described in detail. The analytical condition is derived from the internal geometry of the sensor position with respect to the rear wheel axis. This section corresponds to the function of the Aux (Auxiliary measurement unit) 50 in the block diagram of FIG. 1A and the step 113 in the flowchart of FIG. 2.

Figure 6:
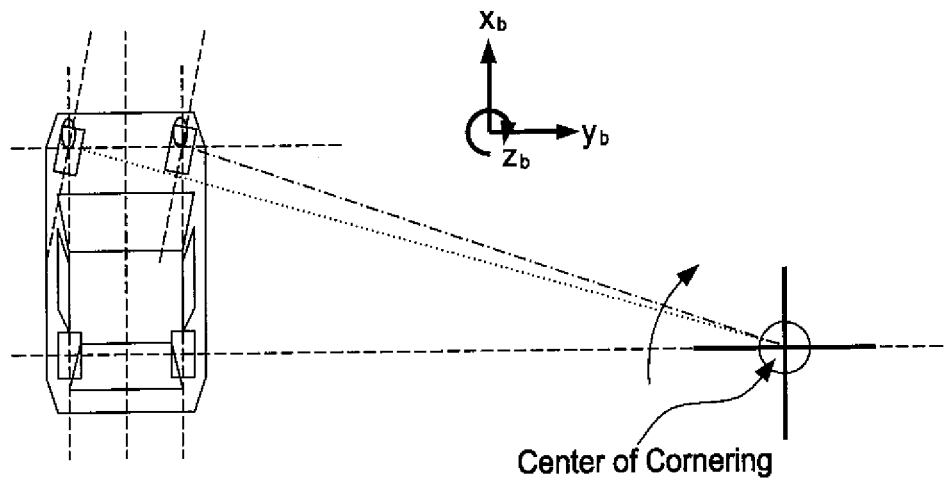
FIG. 6 is a schematic diagram for explaining a basic concept of the embodiment that incorporates so-called Ackermann Steering Geometry.

FIG. 6 shows so-called Ackermann Steering Geometry (see Genta, G., "MOTOR VEHICLE DYNAMICS Modeling and Simulation", World Scientific Publishing Co. Pte. Ltd., 1997, 5 Toh Tuck Link, Singapore, pp. 206-207) in which a tangential line from the center of each front wheel passes a single center of cornering. FIG. 6 also shows that the rear wheels do not tilt in cornering for majority of vehicles.

Figure 7:
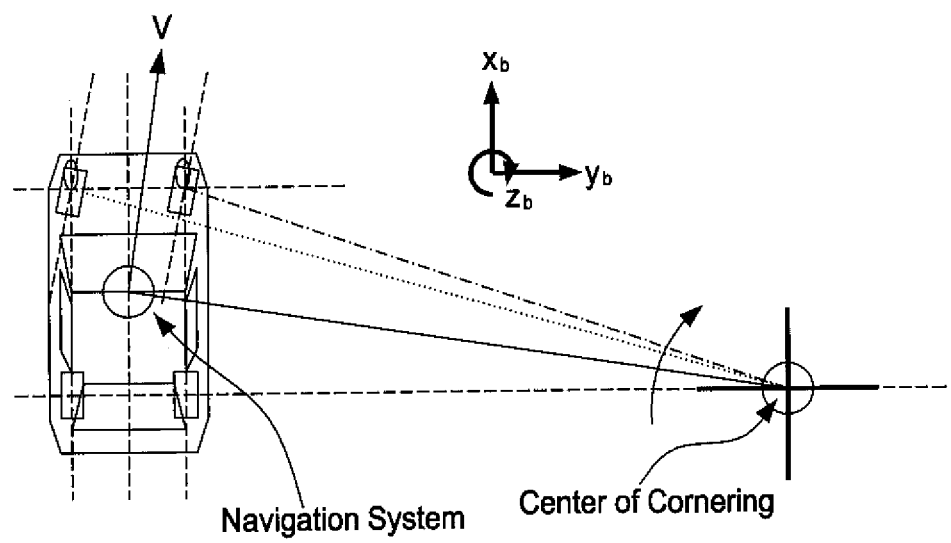
FIG. 7 is a schematic diagram similar to that of FIG. 6 showing the situation where the navigation system attached to the vehicle has the velocity "V" in the direction tangential to the line toward the center of cornering.

Because of this basic mechanism, a point in the vehicle in front of the rear wheel axis has non-zero side velocity in the $y_b$ direction. FIG. 7 illustrates that the navigation system attached to the vehicle has the velocity vector "V" in the direction tangential to the line toward the center of cornering which is not exactly aligned in the $x_b$ direction. The existence of the side velocity, or the $y_b$ component of V, or $v_{by}$, is largely noticeable for a driver of a van or pickup which has a long body from the front to end.

Figure 8:
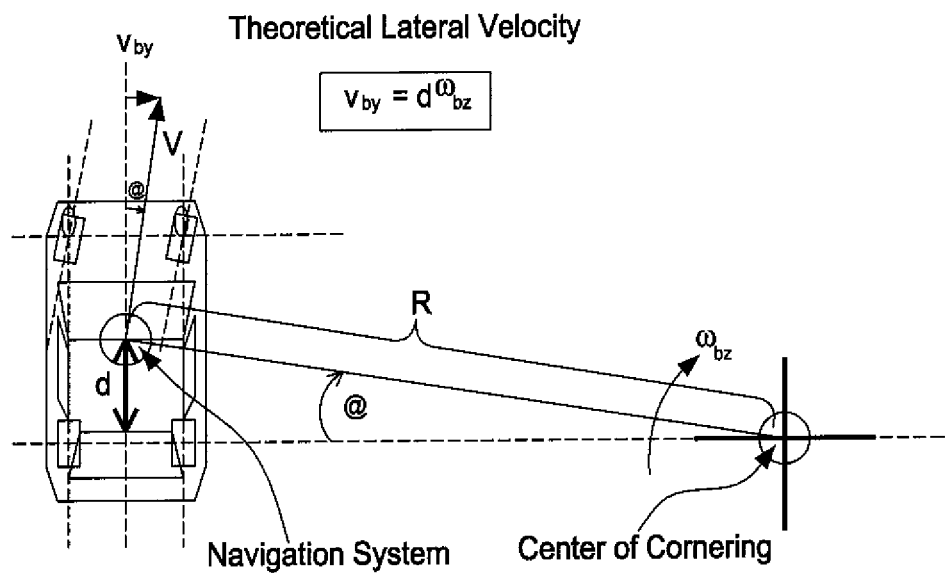
FIG. 8 is a schematic diagram similar to that of FIG. 7 showing derivation of an analytical condition involving a location of the navigation system in the vehicle.

In FIG. 8, the analytical value of $v_{by}$ is derived. Define the following parameters:

$\omega_{bz}$: vehicle's directional angular rate with respect to the $z_b$-axis @: sideslip angle between the $x_b$ direction and V direction d: distance of the sensor position with respect to the rear wheel axis R: the radius of cornering V: magnitude of V Using these parameters defined, the following theoretical derivations hold true $$v_{by} = V \sin @ \quad\quad\quad (A)$$
$$= (R\omega_{bz})\sin @$$

Meanwhile $\sin @ = \dfrac{d}{R}$

Substituting this into $v_{by} = (R\omega_{bz})\sin @$, we have $v_{by} = (R\omega_{bz})\dfrac{d}{R}$ or $v_{by} = d\omega_{bz}$ To incorporate this analytical condition into the Kalman filter algorithm for avoiding need of measuring the distance "d" by hand, it is possible to These methods will be further described in the following sections.

Figure 9:
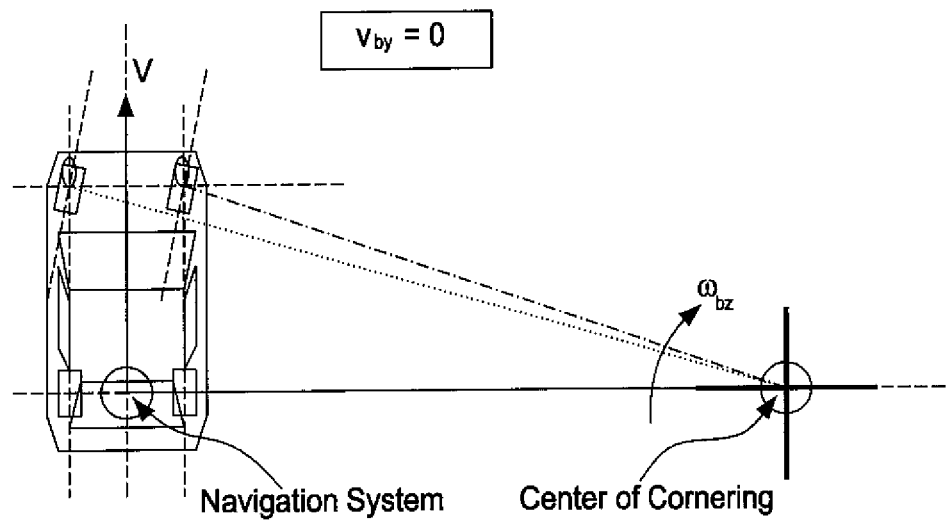
FIG. 9 is a schematic diagram similar to that of FIG. 6 showing the special situation indicating that, only when the sensor IMU (inertial measurement unit) is placed on the rear wheel axis, the condition of zero lateral velocity is achieved.

FIG. 9 shows that only when the sensor IMU is placed on the rear wheel axis, zero distance of the sensor position is achieved, which makes the analytical condition to reduce to simplified "zero lateral velocity":

$$0 = v_{by} \quad\quad\quad (A)'$$

Figure 10:
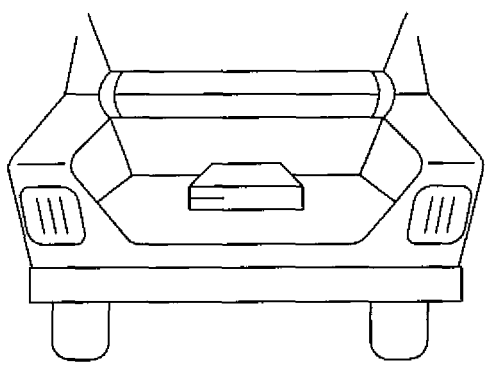
FIG. 10 is a schematic diagram showing the situation where placing the sensor IMU (inertial measurement unit) at the bottom of the trunk will yield the zero distance of the sensor position with respect to the rear wheel axis.

This special condition is within the scope of the analytical condition of Equation (A) which can be achieved by d=0. FIG. 10 shows that, in many cases, placing a sensor IMU at the bottom of the trunk of the vehicle will yield zero distance (d=0) of the sensor position with respect to the rear wheel axis.

INS Technology

Next, description will be made regarding the INS technology to update navigation state estimates including platform position, velocity, and orientation. This section corresponds to the function of the INS (inertial navigation system) 20 in the block diagram of FIG. 1A and the step 112 in the flowchart of FIG. 2. In the following equations, a dot above a variable, e.g., if $\dot{v}_s$, represents the time-rate of the variable $v_s$.

$$\dot{v}_s = \omega_s \times v_s + a_s + g_s \quad\quad\quad \text{(1) Velocity Rate Equation}$$

in which $$v_s = \begin{bmatrix} v_{sx} \\ v_{sy} \\ v_{sz} \end{bmatrix}: \text{velocity vector with respect to the sensor-fixed}$$

coorinated system $$\omega_s = \begin{bmatrix} \omega_{sx} \\ \omega_{sy} \\ \omega_{sz} \end{bmatrix}: \text{three-axis gyro output vector with respect to the}$$

sensor-fixed coordinate system $$a_s = \begin{bmatrix} a_{sx} \\ a_{sy} \\ a_{sz} \end{bmatrix}: \text{three-axis accelerometer output vector with respect}$$

to the sensor-fixed coordinate system $g_s$: gravity vector transformed into the sensor-fixed coordinate system $$\dot{c}_{00} = c_{01}\omega_{sz} - c_{02}\omega_{sy}$$

$$\dot{c}_{10} = c_{11}\omega_{sz} - c_{12}\omega_{sy}$$

$$\dot{c}_{20} = c_{21}\omega_{sz} - c_{22}\omega_{sy}$$

$$\dot{c}_{21} = -c_{20}\omega_{sz} + c_{22}\omega_{sx} \quad\quad\quad \text{(2) Orientation Rate Equation}$$

---

1. incorporate the constant parameter "d" into the INS navigation states and the Kalman filter's states     METHOD 1
2. use the following auxiliary measurement in the Kalman filter's calibration process in addition to GPS measurement $0 = v_{by} - d\omega_{bz}$     METHOD 2 in which $$\begin{bmatrix} c_{00} & c_{01} & c_{02} \\ c_{10} & c_{11} & c_{12} \\ c_{20} & c_{21} & c_{22} \end{bmatrix} = T_{ns}\text{: transformation matrix from the sensor}$$

coordinate system to the NED coordinate system.

Equation (2) is derived in the conventional INS (Inertial Navigation System) technology as shown below:

$$\begin{bmatrix} \dot{c}_{00} & \dot{c}_{01} & \dot{c}_{02} \\ \dot{c}_{10} & \dot{c}_{11} & \dot{c}_{12} \\ \dot{c}_{20} & \dot{c}_{21} & \dot{c}_{22} \end{bmatrix} = \begin{bmatrix} c_{00} & c_{01} & c_{02} \\ c_{10} & c_{11} & c_{12} \\ c_{20} & c_{21} & c_{22} \end{bmatrix} \begin{bmatrix} 0 & -\omega_{sz} & \omega_{sy} \\ \omega_{sz} & 0 & -\omega_{sx} \\ -\omega_{sy} & \omega_{sx} & 0 \end{bmatrix} :$$

orientation rate equation

The transformation matrix, $T_{ns}$, carries the information of angles between the sensor fixed coordinate system and the NED coordinate system. When it is necessary to convert the transformation-matrix representation into Eularian angles between the sensor and NED coordinate systems, it is possible to execute the following steps (see also U.S. Pat. No. 7,957,898 "Computational Scheme for MEMS Inertial Navigation Systems" issued to Hoshizaki, T.):

$$\begin{bmatrix} C_{E2}C_{E3} & -C_{E1}S_{E3} + S_{E1}S_{E2}C_{E3} & S_{E1}S_{E3} + C_{E1}S_{E2}C_{E3} \\ C_{E2}S_{E3} & C_{E1}C_{E3} + S_{E1}S_{E2}S_{E3} & -S_{E1}C_{E3} + C_{E1}S_{E2}S_{E3} \\ -S_{E2} & S_{E1}C_{E2} & C_{E1}C_{E2} \end{bmatrix} =$$

$$\begin{bmatrix} c_{00} & c_{01} & c_{02} \\ c_{10} & c_{11} & c_{12} \\ c_{20} & c_{21} & c_{22} \end{bmatrix}$$

Step 1. $\sin(E_2) = -c_{20}$  $\cos(E_2) = \sqrt{1 - \sin^2(E_2)} > 0$

Step 2. $\sin(E_1) = \frac{c_{21}}{\cos(E_2)}$  $\cos(E_1) = \sqrt{1 - \sin^2(E_1)} > 0$ Step 3. $\sin(E_3) = \frac{c_{10}}{\cos(E_2)}$  $\cos(E_3) = \frac{c_{00}}{\cos(E_2)}$ in which
$E_3$: yaw angle of the sensor coordinate system with respect to the NED coordinate system
$E_2$: pitch angle of the sensor coordinate system with respect to the NED coordinate system
$E_1$: roll angle of the sensor coordinate system with respect to the NED coordinate system
$C_{E1}, S_{E1} \ldots : \cos(E_1), \sin(E_1)$, and so on
In the above steps, the following automotive platform conditions are assumed:
$-90 \text{ deg} < E_2 < +90 \text{ deg}$  $-90 \text{ deg} < E_1 < +90 \text{ deg}$ $\dot{N} = v_{nx}$ $\dot{E} = v_{ny}$ $\dot{D} = v_{nz}$  (3) Position Rate Equation in which
N: northerly displacement
E: easterly displacement
D: downward displacement $$\begin{bmatrix} v_{nx} \\ v_{ny} \\ v_{nz} \end{bmatrix} = v_n = T_{ns}v_s = \begin{bmatrix} c_{00} & c_{01} & c_{02} \\ c_{10} & c_{11} & c_{12} \\ c_{20} & c_{21} & c_{22} \end{bmatrix} \begin{bmatrix} v_{sx} \\ v_{sy} \\ v_{sz} \end{bmatrix}: \text{velocity vector}$$

transformed into NED coordinate system.

The following equations represent constant dynamics. Sensor biases are assumed constant as follows, although they drift slowly according to the temperature change in reality.

$\dot{b}_{\omega x} = 0$ $\dot{b}_{\omega y} = 0$ $\dot{b}_{\omega z} = 0$ \hfill (4-1)

$\dot{b}_{ax} = 0$ $\dot{b}_{ay} = 0$ $\dot{b}_{az} = 0$ \hfill (4-2)

$\dot{p}_{00} = 0$ $\dot{p}_{10} = 0$ $\dot{p}_{20} = 0$ \hfill (4-3)

$\dot{d} = 0$ \hfill (4-4)

in which $$\begin{bmatrix} b_{\omega x} \\ b_{\omega y} \\ b_{\omega z} \end{bmatrix} = B_\omega\text{: gyro bias vector with respect to sensor fixed}$$

coordinate system $$\begin{bmatrix} b_{ax} \\ b_{ay} \\ b_{az} \end{bmatrix} = B_a\text{: accelerometer bias vector with respect to sensor}$$

fixed coordinate system $$\begin{bmatrix} p_{00} & p_{01} & p_{02} \\ p_{10} & p_{11} & p_{12} \\ p_{20} & p_{21} & p_{22} \end{bmatrix} = T_{bs}\text{: transformation matrix from the sensor}$$

coordinated-fixed system to vehicle body fixed coordinate system d: distance between the sensor IMU position and the rear wheel axis The transformation matrix, $T_{bs}$, carries the information of angles between the sensor fixed coordinate system and the vehicle body fixed coordinate system. When it is necessary to convert the transformation-matrix representation into Eulerian angles between the sensor and vehicle body fixed coordinate systems, it is possible to execute the following steps (see also U.S. Pat. No. 7,957,898 "Computational Scheme for MEMS Inertial Navigation Systems" issued to Hoshizaki, T.):

$$\begin{bmatrix} C_{A2}C_{A3} & -S_{A3} & S_{A2}C_{A3} \\ C_{A2}S_{A3} & C_{A3} & S_{A2}S_{A3} \\ -S_{A2} & 0 & C_{A2} \end{bmatrix} = \begin{bmatrix} p_{00} & p_{01} & p_{02} \\ p_{10} & p_{11} & p_{12} \\ p_{20} & 0 & p_{22} \end{bmatrix}$$

Step 1. $\sin(A_2) = -p_{20}$  $\cos(E_2) = \sqrt{1 - \sin^2(A_2)} > 0$

Step 2. $\sin(A_3) = \dfrac{p_{10}}{\cos(A_2)}$  $\cos(E_1) = \sqrt{1 - \sin^2(A_3)} > 0$ in which
$A_3$: yaw angle of the sensor coordinate system with respect to the vehicle body fixed coordinate system
$A_2$: pitch angle of the sensor coordinate system with respect to the vehicle body fixed coordinate system
$A_1$: roll angle of the sensor coordinate system with respect to the vehicle body fixed coordinate system
$C_{A2}, S_{A2}, \ldots$ : $\cos(A_2), \sin(A_2)$, and so on
In the above steps, the following practical conditions are assumed:

$A_1 = 0$  $-90 \deg < A_2 < +90 \deg$  $-90 \deg < A_3 < +90 \deg$

Summarizing Equations (1) through (4) reduces to a vector representation:

$$\dot{x} = f(x, \omega_s, a_s) \quad (5)$$

in which the non-linear state vector is defined by $x = [v_{sx}, v_{sy}, v_{sz}, N, E, D, c_{00}, c_{10}, c_{20}, c_{21}, b_{\omega x}, b_{\omega y}, b_{\omega z}, b_{ax}, b_{ay}, b_{az}, p_{00}, p_{10}, p_{20}, d]$ where incorporation of "d" into the navigation states is one of the unique methods of the navigation system as mentioned earlier as METHOD 1.

To time-integrate Equation (5) on a processor, the following well-known Runge-Kutta 4th order equation is used (see Kreyszig, E., "Advanced Engineering Mathematics", John Wiley & Sons, 1999, New York, N.Y., pp. 947-948):

$$A = T \times f(x_k, \omega_{s,k}, a_{s,k}) \quad (6)$$

$$B = T \times f\left(x_k + \frac{1}{2}A, \omega_{s,k}, a_{s,k}\right)$$

$$C = T \times f\left(x_k + \frac{1}{2}B, \omega_{s,k}, a_{s,k}\right)$$

$$D = T \times f(x_k + C, \omega_{s,k}, a_{s,k})$$

$$x_{k+1} = x_k + \frac{1}{6}(A + 2B + 2C + D)$$

in which
T: sampling time, e.g., 0.04 sec for 25 Hz
$x_k$ value of x at the k-th time epoch of $t = t_k = T \times k$
The INS technology described above is MEMS based simplified INS method based on conventional INS technology with simplification of small terms such as Earth rotation and Earth curvature (see U.S. Pat. No. 7,957,898 "Computational Scheme for MEMS Inertial Navigation Systems" issued to Hoshizaki, T.).

Kalman Filter Technology

The Kalman filter technology is described which is used to calibrate the INS estimates based upon reference measurement. This section corresponds to the functions of the Kalman filter 30 in the block diagram of FIG. 1A and the step 114 in the flowchart of FIG. 2.

Kalman Filter State Equation:

The first step of Kalman filter implementation is to linearize Equation (5) around a set of particular estimates of $\hat{x}_k$ to approximate the dynamics of the small error $\delta x$ with respect to the currently known estimates, $\hat{x}_k$. Here, a parameter with a hat represents that it is an estimate of the parameter, e.g., $\hat{x}_k$ is the estimated amount of the parameter, $x_k$. Since the linearized equation remains accurate only for small value of $\delta x$ around $\hat{x}_k$, it is called "small perturbation equation".

$$\delta x_{k+1} = F(\hat{x}_k)\delta x_k \Gamma_k(\hat{x}_k)w_k \quad (7)$$

in which the Kalman filter's state vector (small perturbation vector) is given by $\delta x = [\delta v_{sx}, \delta v_{sy}, \delta v_{sz}, \delta N, \delta E, \delta D, \delta \alpha, \delta \beta, \delta \gamma, b_{\omega x}, b_{\omega y}, b_{\omega z}, b_{ax}, b_{ay}, b_{az}, \delta b, \delta c, \delta d]$ where incorporation of "d" into the Kalman filter states is one of the unique methods of this navigation system as mentioned earlier as METHOD 1.

$\hat{x}_k$: estimated value of $X_k$ at $t = t_k$ $x_k = \hat{x}_k + \delta x$: relationship between the estimated value, $\hat{x}_k$, and the exact value, $x_k$ $$w_k = \begin{bmatrix} w_{\omega x} \\ w_{\omega y} \\ w_{\omega z} \\ w_{ax} \\ w_{ay} \\ w_{az} \end{bmatrix} : \text{input noise vector regarding three-axis gyro}$$

output, $\omega_s$, and three-axis accelerometer output, $a_s$, with white model in the discrete time space Standard deviation ($\sigma$) of each white noise is defined as follows:

$\sigma_{\omega x} = N_{\omega x}$ $\sigma_{\omega y} = N_{\omega y}$ $\sigma_{\omega z} = N_{\omega z}$ $\sigma_{ax} = N_{ax}$ $\sigma_{ay} = N_{ay}$ $\sigma_{ax} = N_{ax}$ Note that these statistical noise specifications are defined in the discrete time space to be used for Equation (7). Statistical noise specification can be obtained by taking sensor measurements at the designated frequency, at 25 Hz for the above example, for enough time in the static condition.

Here, "$\delta\alpha, \delta\beta, \delta\gamma$" are small perturbations of "$c_{00}, c_{10}, c_{20}, c_{21}$" where "$\delta\alpha, \delta\beta, \delta\gamma$" and "$\delta c_{00}, \delta c_{10}, \delta c_{20}, \delta C_{21}$" have the following relationship:

$$\begin{bmatrix} \delta c_{00} & \delta c_{01} & \delta c_{02} \\ \delta c_{10} & \delta c_{11} & \delta c_{12} \\ \delta c_{20} & \delta c_{21} & \delta c_{22} \end{bmatrix} = -\begin{bmatrix} 0 & -\delta\gamma & \delta\beta \\ \delta\gamma & 0 & -\delta\alpha \\ -\delta\beta & \delta\alpha & 0 \end{bmatrix}\begin{bmatrix} c_{00} & c_{01} & c_{02} \\ c_{10} & c_{11} & c_{12} \\ c_{20} & c_{21} & c_{22} \end{bmatrix} \quad (8)$$

Similarly, "$\delta b, \delta c$" are small perturbations of "$p_{00}, p_{10}, p_{20}$," where "$\delta b, \delta c$" and "$\delta p_{00}, \delta p_{10}, \delta p_{20}$" have the following relationship:

$$\begin{bmatrix} \delta p_{00} & \delta p_{01} & \delta p_{02} \\ \delta p_{10} & \delta p_{11} & \delta p_{12} \\ \delta p_{20} & \delta p_{21} & \delta p_{22} \end{bmatrix} = -\begin{bmatrix} 0 & -\delta c & \delta b \\ \delta c & 0 & -\delta a \\ -\delta b & \delta a & 0 \end{bmatrix} \begin{bmatrix} p_{00} & p_{01} & p_{02} \\ p_{10} & p_{11} & p_{12} \\ p_{20} & p_{21} & p_{22} \end{bmatrix} \quad (9)$$

Here, it is assumed that there is no roll angle of the sensor-fixed coordinate system with respect to the vehicle-fixed coordinate system ($A_1=0$), so as its small perturbation $\delta a=0$).

Using the first order approximation, the matrices of $F(\hat{x}_k)$ and $\Gamma_k(\hat{x}_k)$ are given by the following Equations (10) and (11). The matrix element with no indication means 0. The following notations are used in the matrix representations:

$$I = \begin{bmatrix} 1 & 0 & 0 \\ 0 & 1 & 0 \\ 0 & 0 & 1 \end{bmatrix} : \text{3 by 3 identity matrix}$$

$$g_n = \begin{bmatrix} 0 \\ 0 \\ 9.8 \text{ m/s}^2 \end{bmatrix} : \text{gravity vector with respect to the NED}$$

coordinate system $$Rot(\omega_s) = \begin{bmatrix} 0 & -\omega_{sz} & \omega_{sy} \\ \omega_{sz} & 0 & -\omega_{sx} \\ -\omega_{sy} & \omega_{sx} & 0 \end{bmatrix},$$

where $\omega_s = \begin{bmatrix} \omega_{sx} \\ \omega_{sy} \\ \omega_{sz} \end{bmatrix}$ : 3 by 3 matrix formation using a 3 by 1 vector of $\omega_s$ T: sampling time, e.g., T=0.04 sec for 25 Hz

| $\Gamma(\hat{x}_k)$ | | | (11) |
|---|---|---|---|
| | $w_{\omega x}, w_{\omega y}, w_{\omega z}$ | $w_{ax}, w_{ay}, w_{az}$ | |
| $\delta v_{xb}$ | $Rot(\hat{v}_s)$ | I | |
| $\delta v_{yb}$ | | | |
| $\delta v_{zb}$ | | | |
| $\delta N$ | | | |
| $\delta E$ | | | |
| $\delta D$ | | | |
| $\delta \alpha$ | $-\hat{T}_{ns}$ | | |
| $\delta \beta$ | | | |
| $\delta \gamma$ | | | |
| $b_{\omega xb}$ | | | |
| $b_{\omega yb}$ | | | |
| $b_{\omega zb}$ | | | |
| $b_{axb}$ | | | |
| $b_{ayb}$ | | | |
| $b_{azb}$ | | | |
| $\delta b$ | | | |
| $\delta c$ | | | |
| $\delta d$ | | | |

While Equation (6) updates navigation states at a high frequency, uncertainties of the navigation estimates accumulate over time. The uncertainties of the navigation states can be mathematically represented by a covariance matrix as follows:

$$P = E[\delta x \ \delta x^T] = \begin{bmatrix} E[\delta v_{sx} \delta v_{sx}] & E[\delta v_{sx} \delta v_{sy}] & E[\delta v_{sx} \delta v_{sz}] & \\ E[\delta v_{sy} \delta v_{sx}] & E[\delta v_{sy} \delta v_{sy}] & E[\delta v_{sy} \delta v_{sz}] & \cdots \\ E[\delta v_{sz} \delta v_{sx}] & E[\delta v_{sz} \delta v_{sy}] & E[\delta v_{sz} \delta v_{sz}] & \\ & \vdots & & \ddots \end{bmatrix}$$

covariance matrix defined for small perturbation states

The covariance matrix must be also updated along with Equation (6) at a high frequency according to the following equation so that the Kalman filter method can calibrate the navigation state estimates:

$$P_{k+1} = F(\hat{x}_k) P_k^- F(\hat{x}_k)^T + \Gamma(\hat{x}_k) Q_k \Gamma(\hat{x}_k)^T \quad (12)$$

in which
superscript "T": transpose of the matrix
superscript "−": before the Kalmanf filter calibration at the time-epoch of $t_k$

| | $F(\hat{x}_k)$ | | | | | | | | | | | | | | | | | (10) |
|---|---|---|---|---|---|---|---|---|---|---|---|---|---|---|---|---|---|---|
| | $\delta v_{sx}$ $\delta v_{sy}$ $\delta v_{sz}$ | $\delta N$ | $\delta E$ | $\delta D$ | $\delta \alpha$ $\delta \beta$ $\delta \gamma$ | $b_{\omega x}$ $b_{\omega y}$ $b_{\omega z}$ | $b_{ax}$ $b_{ay}$ $b_{az}$ | $\delta b$ | $\delta c$ | $\delta d$ |
| $\delta v_{sx}$ | I-Rot($\omega_s$)T | | | | $-\hat{T}_{sn}Rot(g_n)T$ | Rot($\hat{v}_s$)T | IT | | | |
| $\delta v_{sy}$ | | | | | | | | | | |
| $\delta v_{sz}$ | | | | | | | | | | |
| $\delta N$ | $\hat{T}_{ns}T$ | I | | | Rot($\hat{v}_n$)T | | | | | |
| $\delta E$ | | | | | | | | | | |
| $\delta D$ | | | | | | | | | | |
| $\delta \alpha$ | | | | | I | $-\hat{T}_{ns}T$ | | | | |
| $\delta \beta$ | | | | | | | | | | |
| $\delta \gamma$ | | | | | | | | | | |
| $b_{\omega x}$ | | | | | | I | | | | |
| $b_{\omega y}$ | | | | | | | | | | |
| $b_{\omega z}$ | | | | | | | | | | |
| $b_{ax}$ | | | | | | | I | | | |
| $b_{ay}$ | | | | | | | | | | |
| $b_{az}$ | | | | | | | | | | |
| $\delta b$ | | | | | | | | I | | |
| $\delta c$ | | | | | | | | | | |
| $\delta d$ | | | | | | | | | | | superscript "+": after the Kalmanf filter calibration at the time-epoch of $t_k$ $$Q_k = E[w_k \ w_k^T] = \begin{bmatrix} N_{\omega x}^2 & 0 & 0 & 0 & 0 & 0 \\ 0 & N_{\omega y}^2 & 0 & 0 & 0 & 0 \\ 0 & 0 & N_{\omega z}^2 & 0 & 0 & 0 \\ 0 & 0 & 0 & N_{ax}^2 & 0 & 0 \\ 0 & 0 & 0 & 0 & N_{ay}^2 & 0 \\ 0 & 0 & 0 & 0 & 0 & N_{az}^2 \end{bmatrix}$$

covariance matrix of $w_k$

Kalman Filter Measurement Equation:

The second step of Kalman filter implementation is to find the relationship between available reference measurements and the Kalman filter states. Such a relationship is called measurement equation. A measurement equation is derived for each measurement in the following.

Here, further analysis is present with respect to the analytical condition that has been derived from the vehicle mechanism noted above. This subsection will complete the details of function of the Aux (auxiliary measurement unit) 50 in the block diagram of FIG. 1A and the step 113 in the flowchart of FIG. 2. In the foregoing discussion, the following analytical condition has been achieved:

$V_{by} d\omega_{bz}$

To incorporate this condition into the Kalman filter algorithm, an auxiliary measurement of $z_1$ is incorporated as $z_1 = v_{by} - d\omega_{bz}$ whose reference value is always $z_1 = 0$ (13-1)

where incorporation of auxiliary measurement equation (13-1) into the Kalman filter measurement is one of the unique methods of this navigation system as mentioned earlier as METHOD 2.

This is a non-linear measurement equation. To incorporate this into the Kalman filter algorithm, the equation is linearized in terms of a set of known estimates of $\hat{x}_k$. After a rigorous mathematical derivation, the linear perturbation equation is found as:

$$\delta v_s = \begin{bmatrix} \delta v_{sx} \\ \delta v_{sy} \\ \delta v_{sz} \end{bmatrix}$$

$$B_\omega = \begin{bmatrix} b_{\omega x} \\ b_{\omega y} \\ b_{\omega z} \end{bmatrix}$$

$$\Delta = \begin{bmatrix} \delta a \\ \delta b \\ \delta c \end{bmatrix}$$

$$w_\omega = \begin{bmatrix} w_{\omega x} \\ w_{\omega y} \\ w_{\omega z} \end{bmatrix}$$

Similarly, since a vehicle is predominantly attached to the road surface, it is also true that:

$v_{bz} = 0$

To incorporate this condition into the Kalman filter algorithm, an auxiliary measurement of $z_2$ is incorporated as $z_2 = v_{bz}$ whose reference value is always $z_2 = 0$ (14-1)

This is the 3rd row of the following vector equation in terms of the navigation states:

$z = T_{bs} v_x$

This is a non-linear measurement equation. To incorporate this into the Kalman filter algorithm, the non-linear equation is linearized in terms of a set of particular estimates of $\hat{x}_k$. After a short derivation, the linear perturbation equation is found as the 3rd row of:

$\delta z = Rot(\hat{v}_b)\Delta + \hat{T}_{bs}\delta v_s$ or, $\delta z_2 = [\hat{p}_{20} 0 \hat{p}_{22}]\delta v_s + [-\hat{v}_{by} \hat{v}_{bx} 0]\Delta$ (14-2)

Next is to analyze the correlation between GPS measurements and the Kalman filter states. This subsection corresponds to the functions of the GPS 60 in the block diagram of FIG. 1A and the step 115 in the flowchart of FIG. 2.

GPS position measurement gives us absolute measurement (i.e., estimates with bounded error) of N, E, and D which can be converted from latitude, longitude, and altitude (see U.S. Pat. No. 7,957,898 "Computational Scheme for MEMS Inertial Navigation Systems" issued to Hoshizaki, T.). Therefore, the measurement equation will be $z_p = p_n$ (15-1)

$\delta z_p = \delta p_n$ (15-2)

in which $$p_n = \begin{bmatrix} N \\ E \\ D \end{bmatrix}$$

$$\delta p_n = \begin{bmatrix} \delta N \\ \delta E \\ \delta D \end{bmatrix}$$

GPS velocity measurement gives us absolute measurement of $$v_n = \begin{bmatrix} v_{nx} \\ v_{ny} \\ v_{nz} \end{bmatrix}.$$

Therefore, the measurement equation will be $z_v = v_n = T_{ns} v_s$ (16-1)

This is a non-linear measurement equation. To incorporate this into the Kalman filter algorithm, the non-linear equation is linearlized in terms of a set of particular estimates of $\hat{x}_k$ to obtain the following equation.

$\delta z_v = Rot(\hat{v}_n)\epsilon + \hat{T}_{ns}\delta v_x$ (16-2)

Summarizing Equations (13-1), (14-1), (15-1), and (16-1) reduces to a vector representation of:

$z_k = h_k(x_k)$ (17)

in which $$z_k = \begin{bmatrix} z_1 \\ z_2 \\ z_p \\ z_v \end{bmatrix},$$

$$h_k(x_k) = \begin{bmatrix} v_{by} - d\omega_{bz} \\ v_{bz} \\ p_n \\ v_n \end{bmatrix}$$

Summarizing Equations of (13-2), (14-2), (15-2), and (16-2) reduces to a vector representation of:

$$\delta z_k = H(\hat{x}_k)\delta x_k + n_k \quad (17\text{-}2)$$

in which $$\delta z_k = \begin{bmatrix} \delta z_1 \\ \delta z_2 \\ \delta z_p \\ \delta z_v \end{bmatrix}$$

$$n_k = \begin{bmatrix} n_{by} \\ n_{bz} \\ n_p \\ n_v \end{bmatrix}$$

$$\begin{bmatrix} \sigma_N \\ \sigma_E \\ \sigma_D \end{bmatrix}: \text{standard deviations for } GPS \text{ velocity measurement}$$

errors ($n_p$) to be given by the GPS receiver in real-time $$\begin{bmatrix} \sigma_{vnx} \\ \sigma_{vny} \\ \sigma_{vnz} \end{bmatrix}: \text{standard deviations for } GPS \text{ velocity measurement}$$

errors ($n_v$) to be given by the GPS receiver in real-time

The measurement matrix $H(\hat{x}_k)$ is given in the following Equation (18). The matrix element with no indication means 0. Notice that:

(i) $H_1$ is always available no matter if GPS signals are available or not. IEKF calibration is always executed based on $H_1$ at an intermediate frequency, e.g., 5 Hz.

(ii) IEKF calibration based on GPS measurement is executed at 1 Hz using $H_2$ only when GPS signals are available.

Execution of IEKF calibration based on auxiliary measurement equation for navigation accuracy enhancement is another unique feature of the embodiments.

(18)

$H(\hat{x}_k)$

| | | $\delta v_{xb}$ | $\delta v_{yb}$ | $\delta v_{zb}$ | $\delta N$ | $\delta E$ | $\delta D$ | $\delta\alpha$ | $\delta\beta$ | $\delta\gamma$ | $b_{\omega x}$ | $b_{\omega y}$ | $b_{\omega z}$ | $b_{ax}$ | $b_{ay}$ | $b_{az}$ | $\delta b$ | $\delta c$ | $\delta d$ |
|---|---|---|---|---|---|---|---|---|---|---|---|---|---|---|---|---|---|---|---|
| $H_1$ | $\delta z_{vby}$ | $\hat{p}_{10}$ | $\hat{p}_{11}$ | $\hat{p}_{11}$ | | | | | | | $d\hat{p}_{20}$ | 0 | $d\hat{p}_{22}$ | | | | $-d\hat{\omega}_{bx}$ | $-\hat{V}_{bx}$ | $\_\hat{\omega}_{bz}$ |
| | $\delta v_{vbz}$ | $\hat{p}_{20}$ | 0 | $\hat{p}_{22}$ | | | | | | | | | | | | | $\hat{V}_{bx}$ | | |
| $H_2$ | $\delta z_p$ | | | | 1 | | | | | | | | | | | | | | |
| | | | | | | 1 | | | | | | | | | | | | | |
| | | | | | | | 1 | | | | | | | | | | | | |
| | $\delta z_v$ | $\hat{c}_{00}$ | $\hat{c}_{01}$ | $\hat{c}_{02}$ | | | | | | | 0 | $-\hat{V}_{nz}$ | $-\hat{V}_{ny}$ | | | | | | |
| | | $\hat{c}_{10}$ | $\hat{c}_{11}$ | $\hat{c}_{12}$ | | | | | | | $-\hat{V}_{nz}$ | 0 | $-\hat{V}_{nx}$ | | | | | | |
| | | $\hat{c}_{20}$ | $\hat{c}_{21}$ | $\hat{c}_{22}$ | | | | | | | $-\hat{V}_{ny}$ | $-\hat{V}_{nx}$ | 0 | | | | | | |

$n_k$ is a measurement error vector which is assumed to be white noise. The size of each measurement error is described in the following:

$\sigma_{nby}\sqrt{\hat{d}^2\hat{p}_{20}^2 N_{\omega x}^2 + \hat{d}^2\hat{p}_{22}^2 N_{\omega z}^2}$: standard deviation for $n_{by}$ derived from Equation (13-2);

This is a design parameter and can be adjusted by investigation of measurement residuals (i.e., differences between reference measurements and state estimates).

A constant parameter of $\sigma_{nby}=0.05$ (m/s) is also a good candidate.

$\sigma_{nbz}$: standard deviation for $n_{bz}$; This is a design parameter and can be adjusted by investigation of measurement residuals. $\sigma_{nbz}=0.05$ (m/s) is a good candidate.

When measurements are available, the following iterative calibration steps are executed for i=0 to "n" (see Gelb, A., Applied Optimal Estimation, THE M.I.T. PRESS, 1974, Cambridge, Mass., pp. 190-191). In many cases, n=1 or 2 gives great improvement compared to no iteration (n=0). There are few cases in which more that 10-time iterations are required.

$$k_{k,i} = P_k^- H_k^T(\hat{x}_{k,i}^+)(H_k(\hat{x}_{k,i}^+) \\ P_k^- H_k^T(\hat{x}_{k,i}^+) + R_k)^{-1} \quad (19) \text{ Computation of Kalman Gain, K}$$

$$\hat{x}_{k,i+1}^+ = \hat{x}_k^- + K_{k,i}[z_k - h_k(\hat{x}_{k,i}^+) - \\ H_k(\hat{x}_{k,i}^+)(\hat{x}_k^- - \hat{x}_{k,i}^+)] \quad (20) \text{ Calibration of State Estimates, x}$$

$$P_{k,i+1}^+ = (I - K_{k,i} H_k(\hat{x}_{k,i}^+)) P_k^- \quad (21) \text{ Calibration of Covariance, P}$$

in which $\hat{x}_{k,0}^+ = \hat{x}_k^-$ sign in the superscript represents that the parameter is calibrated, the "−" sign in the superscript represents that the parameter is not calibrated yet $R_k$: covariance matrix regarding measurements Since the size of $H(\hat{x}_k)$ dynamically changes, the associated $R_k$ also changes according to the following:

$$R_k = \begin{bmatrix} \sigma_{nby}^2 & 0 \\ 0 & \sigma_{nbz}^2 \end{bmatrix} : \text{for Auxiliary Measurement}$$

$$R_k = \begin{bmatrix} \sigma_N^2 & 0 & 0 & 0 & 0 & 0 \\ 0 & \sigma_E^2 & 0 & 0 & 0 & 0 \\ 0 & 0 & \sigma_D^2 & 0 & 0 & 0 \\ 0 & 0 & 0 & \sigma_{vnx}^2 & 0 & 0 \\ 0 & 0 & 0 & 0 & \sigma_{vny}^2 & 0 \\ 0 & 0 & 0 & 0 & 0 & \sigma_{vnz}^2 \end{bmatrix} : \text{for GPS Measurement}$$

Calibration is made not only for the navigation states but also continuously made for inertial sensor outputs in the INS computation with the latest bias estimates according to the following manner:

$$\omega_{sx}^+ = \omega_{sx}^- + b_{\omega x}$$

$$\omega_{sy}^+ = \omega_{sy}^- + b_{\omega y}$$

$$\omega_{sz}^+ = \omega_{sz}^- + b_{\omega z}$$

$$a_{sx}^+ = a_{sx}^- + b_{ax}$$

$$a_{sy}^+ = a_{sy}^- + b_{ay}$$

$$a_{sz}^+ = a_{sz}^- + b_{az}$$

in which $$\omega_s = \begin{bmatrix} \omega_{sx} \\ \omega_{sy} \\ \omega_{sz} \end{bmatrix} : \text{three-axis gyro output vector with respect to the}$$

sensor-fixed coordinate system $$a_s = \begin{bmatrix} a_{sx} \\ a_{sy} \\ a_{sz} \end{bmatrix} : \text{three-axis accelerometer output vector with respect}$$

to the sensor-fixed coordinate

Simulation Results

FIG. 11A through FIG. 18B show simulation results of the embodiments of the INS/GPS navigation system and method described above using the sensor data collected along an actual on-road drive. A mid-sized van was used for this test drive, and the distance of the sensor position with respect to the rear wheel axis is known to be about 1.7 m. Therefore, the actual $v_{by}$ component (side velocity) is definitely non-zero.

Figure 11A:
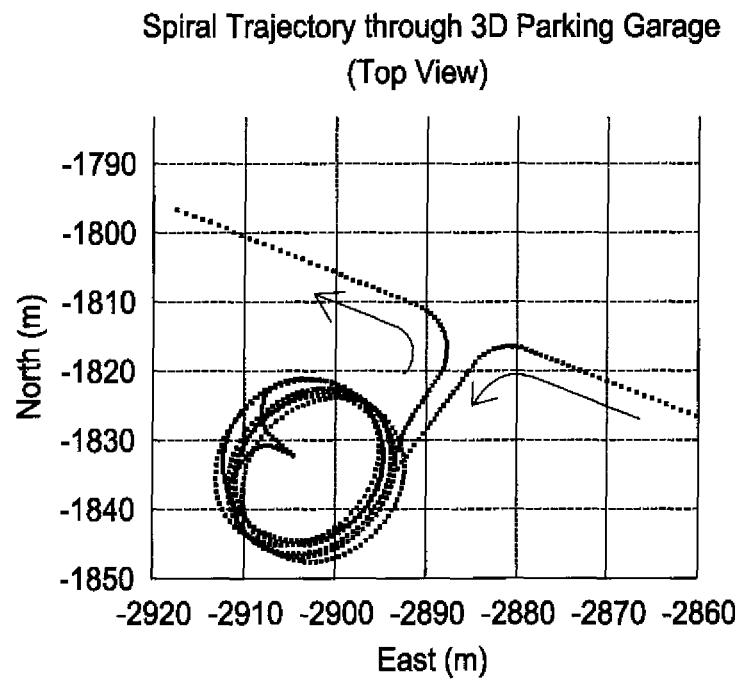
FIGS. 11A and 11B are graphs showing the experimental results involving a three-dimensional parking garage where
Figure 11B:
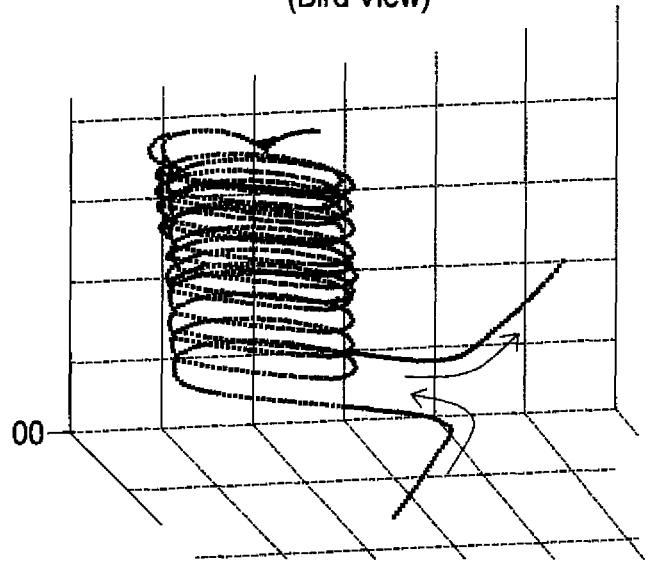

FIG. 11A shows the top view of the navigation solutions with the embodiments applied to the sensor data in which a vehicle drives through a spiral passage of a three-dimensional parking garage building in Yokohama, Japan. The drive inside the parking garage lasts about 4 minutes in which there is no GPS signal available. The spiral trajectory makes circles in FIG. 11A which are desirably located approximately in the same place. FIG. 11B shows the same navigation solutions in the bird view to visualize the vehicle's three-dimensional motion. Although FIG. 11B shows the almost successful result, there is a discrepancy between the entrance height and the exit height for about 10 m which represents navigation inaccuracy.

Figure 12A:
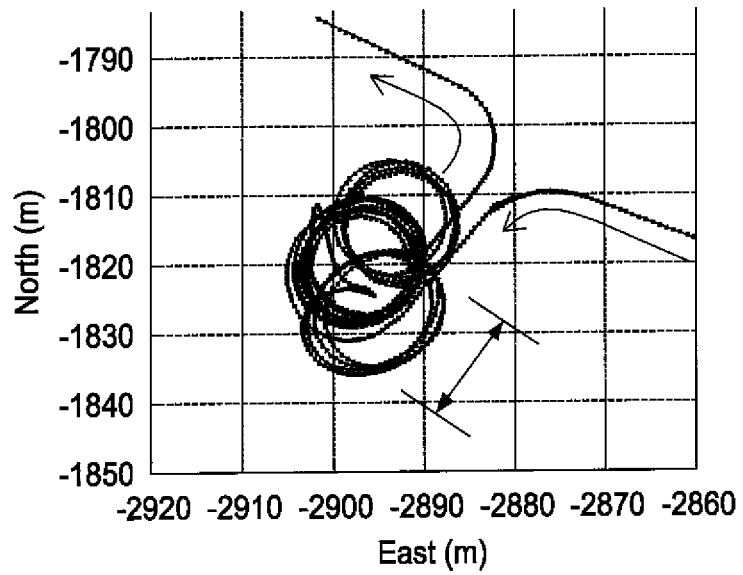
FIGS. 12A and 12B are graphs showing the experimental results involving the three-dimensional parking garage which is the same as that of FIGS. 11A and 11B with respect to the conventional technology of "zero side velocity" where
Figure 12B:
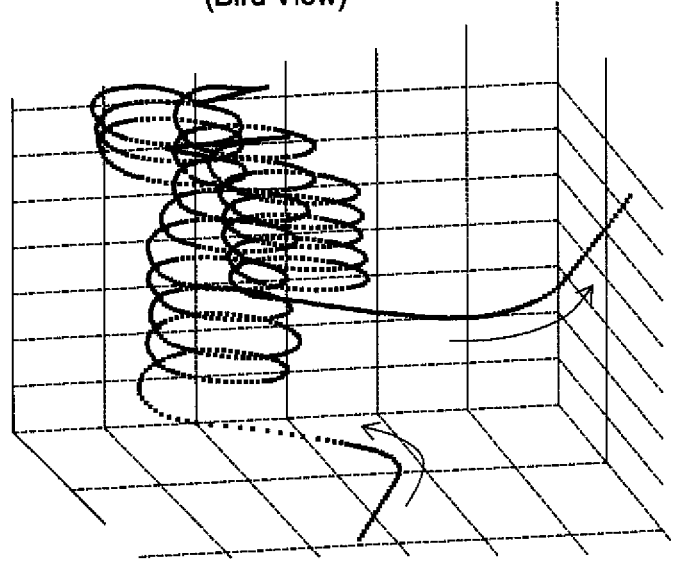

FIGS. 12A and 12B show the top view and bird view, respectively, of the navigation solutions with the conventional technology applying the measurement of "$v_{by}=0$" without consideration of the internal geometry of the sensor position. Degradation in positioning accuracy is noticeable in FIGS. 12A and 12B compared to the positioning accuracy of the embodiments of the new navigation system and method shown in FIGS. 11A and 11B.

The primary reason of the degradation in navigation accuracy of the conventional technology is that suppressing the analytical non-zero value of "$V_{by}=d\omega_{bz}$" into 0 has caused the following unfavorable side effects: (I) shortage of the total amount in the estimate of the forward velocity; (II) erroneous increment of pitch-angle estimate; (III) large error in velocity estimation during a straight drive in either of the forward or backward direction which directly results in large positioning error especially when backing; (IV) large error in velocity estimation during cornering which results in erroneous shift of a circular path. These facts of (I) through (IV) are noticeable in the following figures.

Figure 13A:
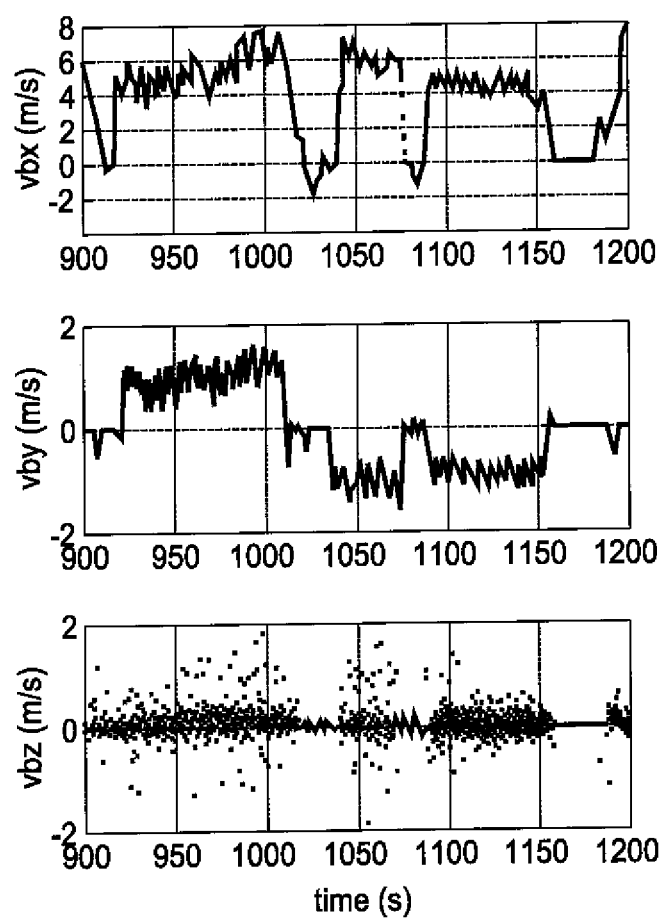
FIGS. 13A-13C are time histories showing the experimental result data concerning velocities in vehicle body fixed axes where
Figure 13B:
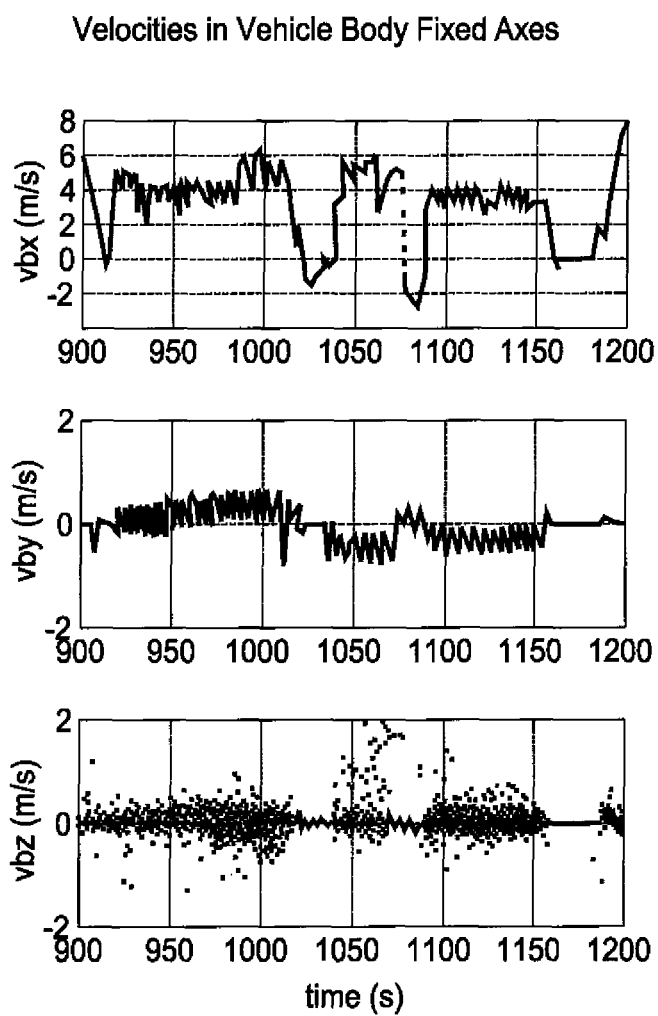
Figure 13C:
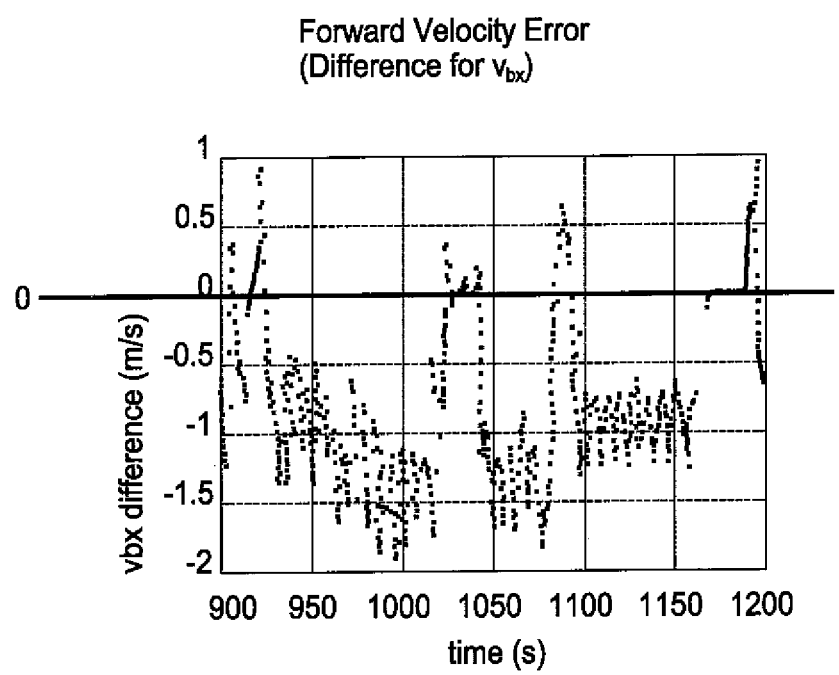

(I) FIG. 13A shows the estimated velocity components in the vehicle body fixed axes made by the embodiments of the new navigation system and method, and FIG. 13B shows the same parameters made by the conventional technology of "$v_{by}=0$". Notice that $v_{by}$ component is much smaller in FIG. 13B than FIG. 13A because of erroneous suppression of "$v_{by}=0$" in FIG. 13B. Since $v_{by}$ is a component of the total velocity, if $v_{by}$ is suppressed to be smaller than the actual value, so does the total velocity, resulting in that $v_{bx}$ is also smaller in FIG. 13B than FIG. 13A up to 2 m/s for the entire data period. FIG. 13C shows the difference of $v_{bx}$ (vehicle's forward velocity) in FIG. 13B from the data in FIG. 13A which ensures the smaller velocity estimates in FIG. 13B than FIG. 13A.

Figure 14A:
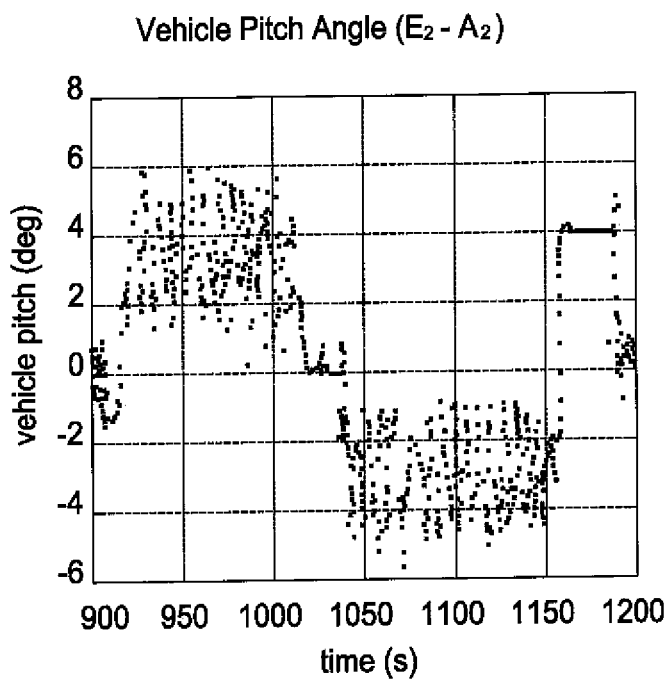
FIGS. 14A-14C are time histories showing the experimental result data concerning the vehicle pitch angle where
Figure 14B:
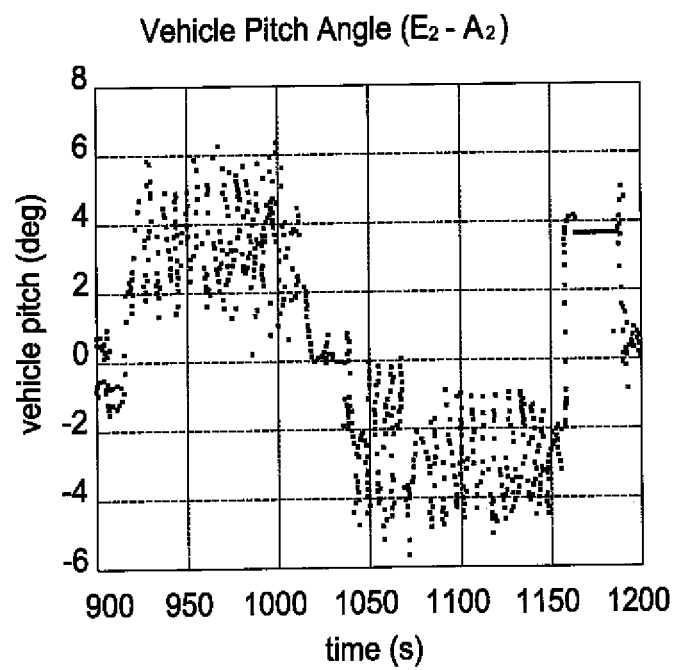
Figure 14C:
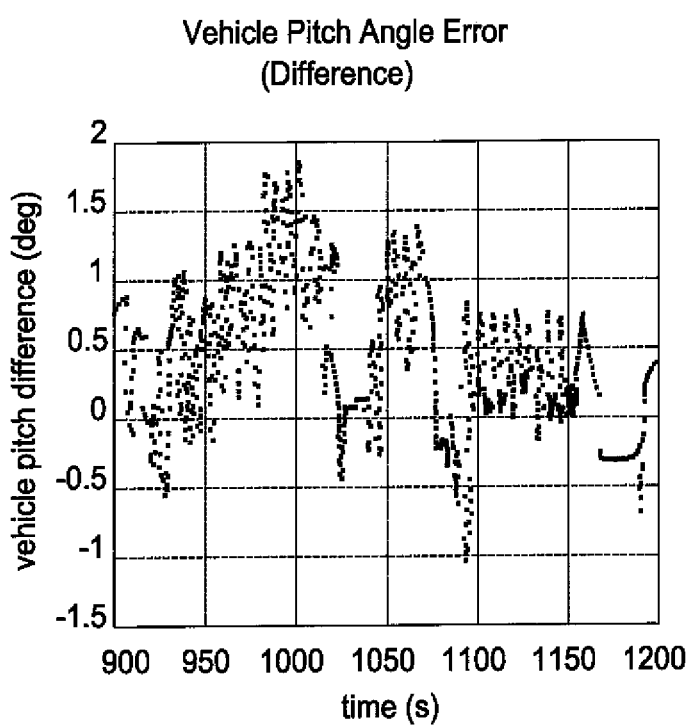

(II) FIG. 14A shows the vehicle's pitch-angle estimate, i.e., $E_2$ (sensor pitch angle to the NED surface)–$A_2$ (sensor attachment pitch angle to vehicle) made by the embodiments of the new navigation system and method. FIG. 14B shows the same parameter made by the conventional technology of "$v_{by}=0$". Comparison of FIGS. 14A and 14B tells that pitch angle in FIG. 14B is larger than FIG. 14A up to 2 degrees as the cost of suppressing the total velocity as described in (I). FIG. 14C shows the difference of the data in FIG. 14B from the data in FIG. 14A. It is clear that the conventional technology makes larger estimates of pitch angle up to two degrees over the new navigation system and method.

Figure 15A:
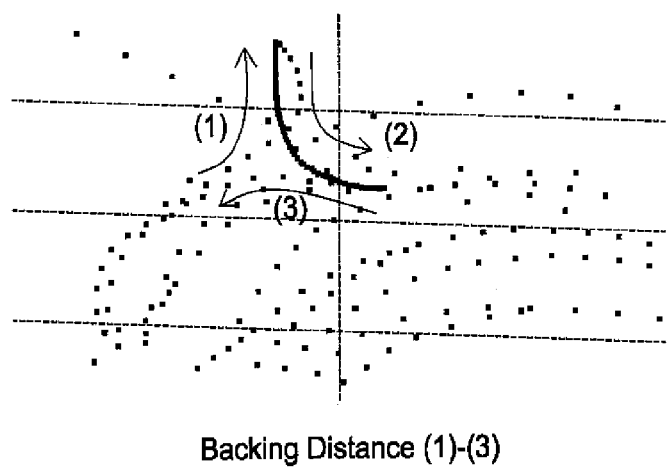
FIG. 15A is a graph showing the experimental results involving the three-dimensional parking garage in accordance with the embodiment of the integrated INS/GPS navigation system and FIG. 15B is a graph showing the experimental results involving the three-dimensional parking garage in accordance with the conventional technology, where
Figure 15B:
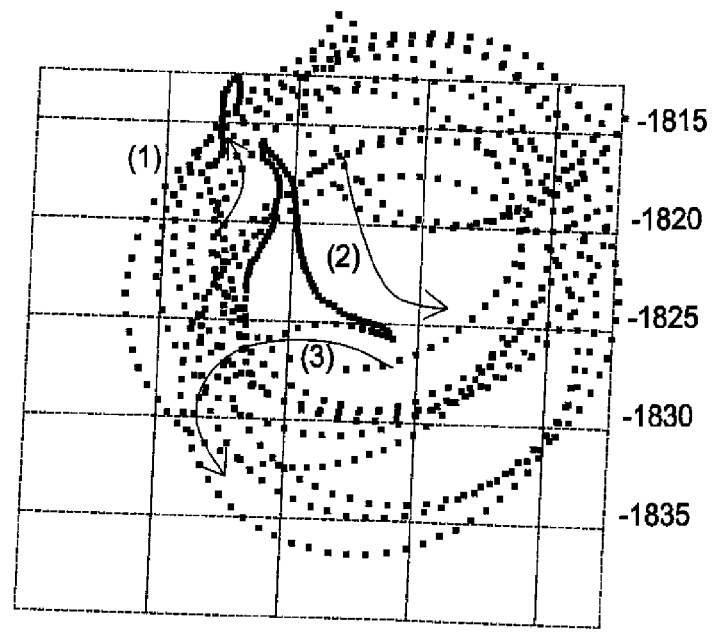

(III) When pitch-angle estimate is larger than the true value, unnecessary deceleration happens in the navigation computation not only when a vehicle is cornering but also when a vehicle is straightly driving. This often results in excessive speed estimate in backing or erroneously estimated backward motion when a vehicle is actually going forward. FIG. 15A shows a magnified view of the navigation trajectory made by the embodiments (the same as FIGS. 11A and 11B) around the vehicle's proper backing motion in the top floor of the spiral parking garage. FIG. 15B shows a magnified view of the navigation trajectory made by the conventional technology of "$v_{by}=0$" (the same as FIGS. 12A and 12) around the vehicle's excessive backing motion in the top floor of the spiral parking garage. The excessive backing motion in FIG. 15B made by the conventional technology is the primary source of large positioning error. Theoretically speaking, 2-degree error in pitch-angle estimation results in 17 m of transitional positioning error after 10 seconds in a forward or backward straight drive as calculated in the following:

$$\text{Straight Path Positioning Error} = 9.8 \ (m/s^2) * \sin(2*pi/180)*0.5*10*10$$

$$= 17.1 \ (m)$$

$$= 0.171 * t^2; t = \text{time in } (sec)$$

Figure 16:
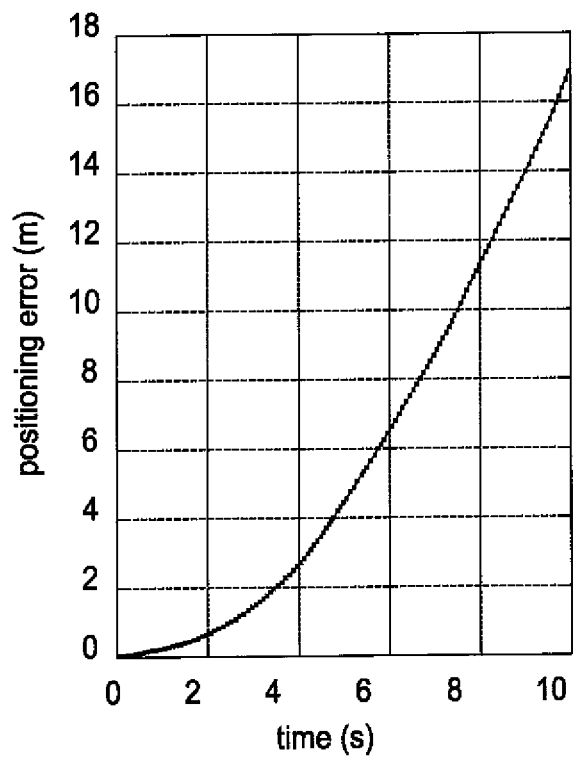
FIG. 16 is a graph showing the theoretical positioning error in a straight drive due to pitch angle estimation errors.

FIG. 16 shows the theoretical amount of the positioning error in a straight path due to pitch angle-estimation error of 2 degrees over time based on the equation above.

Figure 17A:
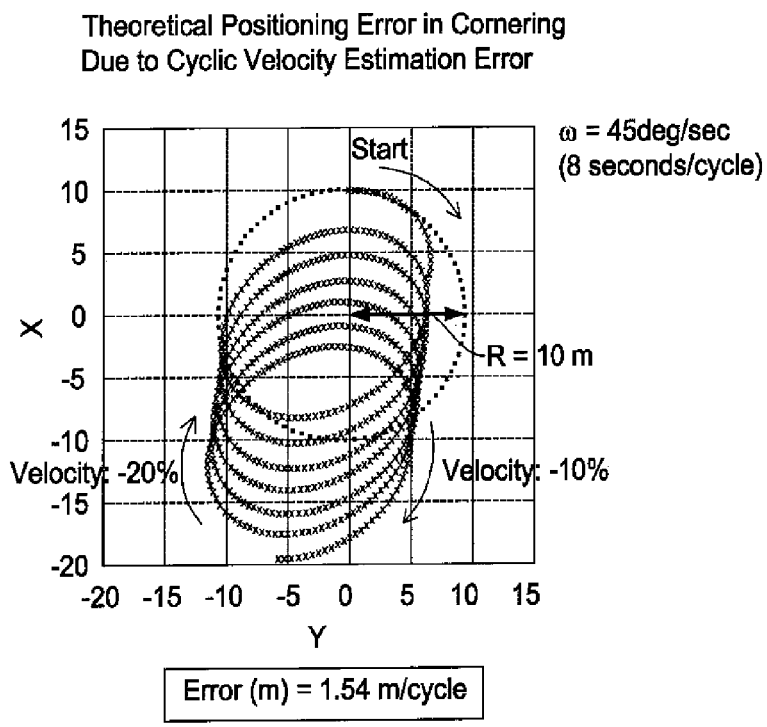
FIG. 17A is a graph showing the theoretical positioning error in cornering due to cyclic errors in velocity estimation.
Figure 17B:
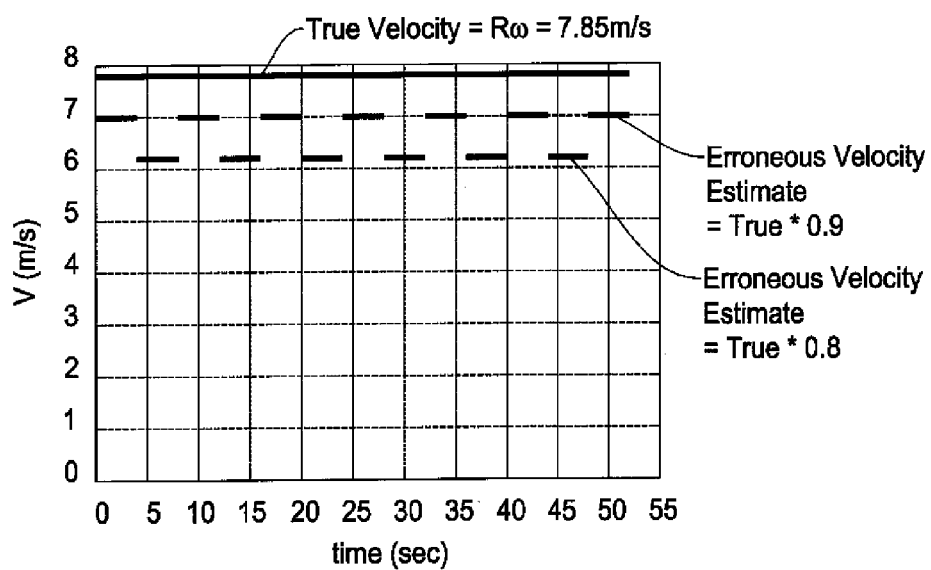
FIG. 17B is a graph showing the simulated velocity error used for estimating the theoretical positioning error of FIG. 17A.

(IV) A shortage in forward speed estimation happens often cyclically in cornering as already shown in FIG. 13C which results in erroneous shift of a circular path. FIG. 17A shows a plotting of the theoretical positioning error in cornering due to cyclic velocity-estimation error. The plotting with dots represents the exact path emulating the circular motion in FIG. 11A with the cornering radius (R) of 10 m and cornering angular rate (ω) of 45 deg/sec. The plotting with "x" represents the erroneous path emulating the conventional technology of "$v_{by}$=0" in which the direction is always inclined to the left to the true angle with (@=9.8 deg (equivalent to the amount with d=1.7 m and R=10 m in FIG. 8). The angle inclination distorts the circular path into an oval shape, and the cyclic error in velocity estimation causes a transitional shift of the circular path. The theoretical amount of positioning error particularly to this example is 1.54 m/cycle representing continuous shift of the circular path to go down. FIG. 17B shows the velocity profiles used to create FIG. 17A in which the plotting with dots (top line) represents the true velocity used to make the circular path and the plotting with "x" (two broken lines) represents the velocity with cyclic error used to create the moving oval trajectory. Aggregation of the errors of FIGS. 16 and 17A appears in FIGS. 12A and 12B.

Figure 18A:
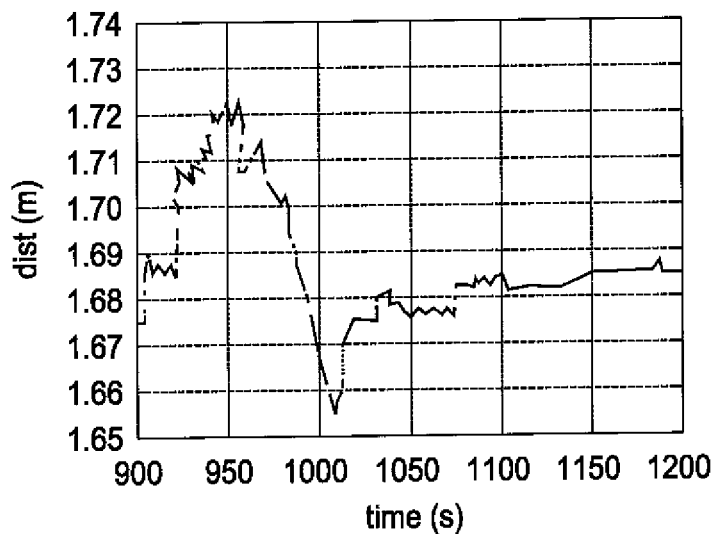
FIGS. 18A and 18B are charts showing the time history of the parameters related to the embodiment of the integrated INS/GPS navigation system where
Figure 18B:
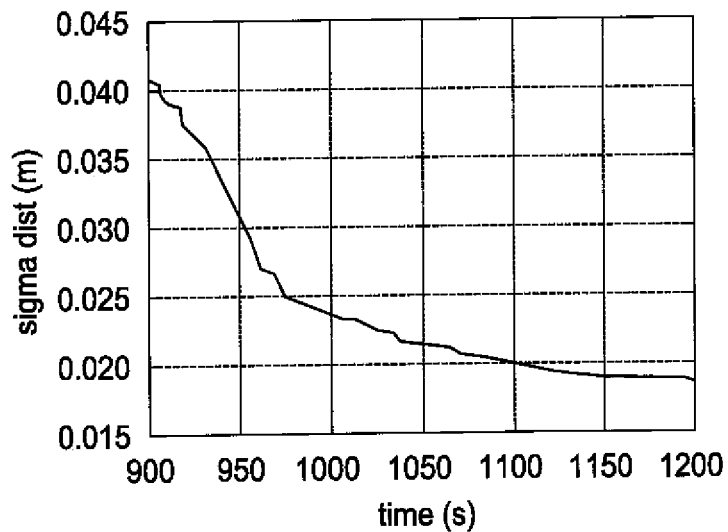

FIG. 18A shows the time history of the estimated distance between the position of the sensor IMU and the vehicle's rear-wheel axis made by the Kalman filter process. FIG. 18B shows the associated uncertainty (sigma value) obtained from the covariance matrix in the Kalman filtering process according to the following equation.

$$\sigma \text{ of } d = \sqrt{P[18,18]}(m)$$

in which P is the covariance matrix. These figures show that, the more cornering, the more calibrated the distance estimation. After undergoing the intensive cornering in a spiral parking garage, the estimation of the distance between the position of the sensor IMU and the vehicle's rear-wheel axis is well converged.

Display

In addition to the normal navigation functionalities, the integrated INS/GPS navigation system and method provides a unique display method utilizing the internal geometry of the sensor position with respect to the vehicle's rear wheel axis. As described above, the embodiments of the integrated INS/GPS navigation system and method will produce the position estimates including the internal geometry of the sensor IMU position with respect to the vehicle's rear wheel axis with high accuracy. Such position estimates will be aligned with vehicle contour information and position information of links, nodes, polygons, etc., i.e., objects (map image) surrounding the vehicle, derived from the map database. This section corresponds to the functions of the navigation operation unit 70 and the display 80 in the block diagram of FIG. 1A and the steps 118 and 119 in the flowchart of FIG. 2. As noted above, such a matching process can be conducted by the navigation operation unit 70 with use of the information from the map database 74 and the contour database 79.

Figure 19:
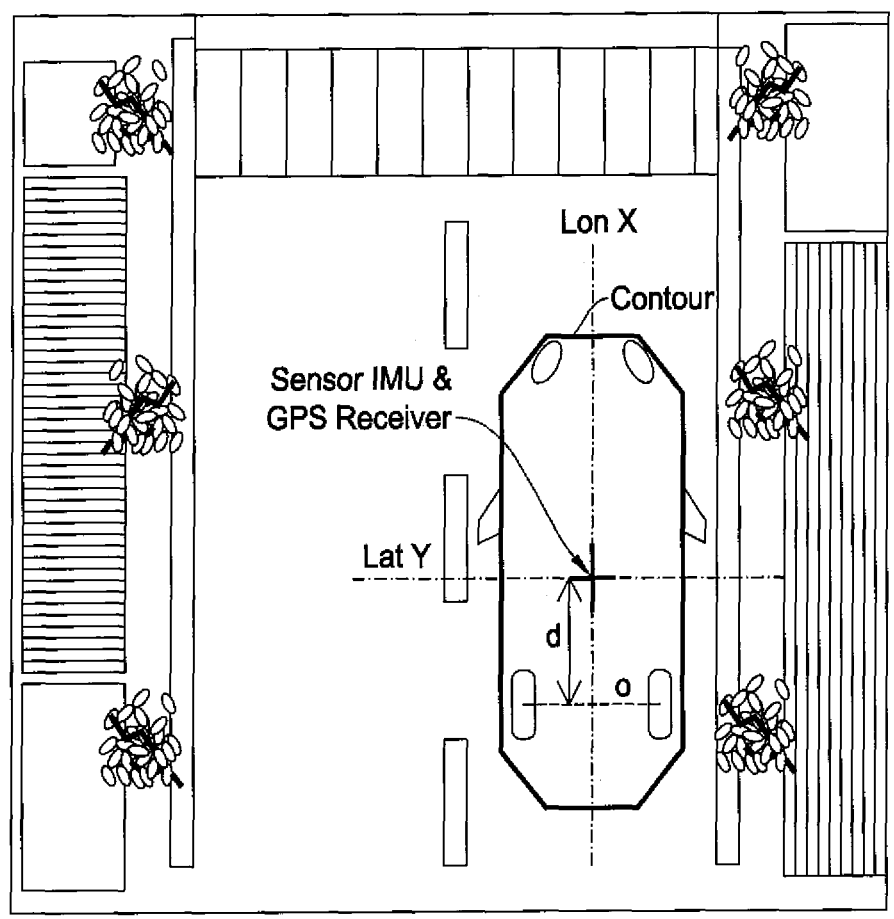
FIG. 19 shows a display image with the vehicle contour and navigation system's position with proper geometry between the navigation system's position and the vehicle contour in which the distance between the navigation system and the rear wheel axis is automatically estimated by the navigation system. The navigation system's absolute position (latitude and longitude), the vehicle contour, and the map images of surrounding objects are aligned by placing the GPS antenna above the navigation system.
Figure 20:
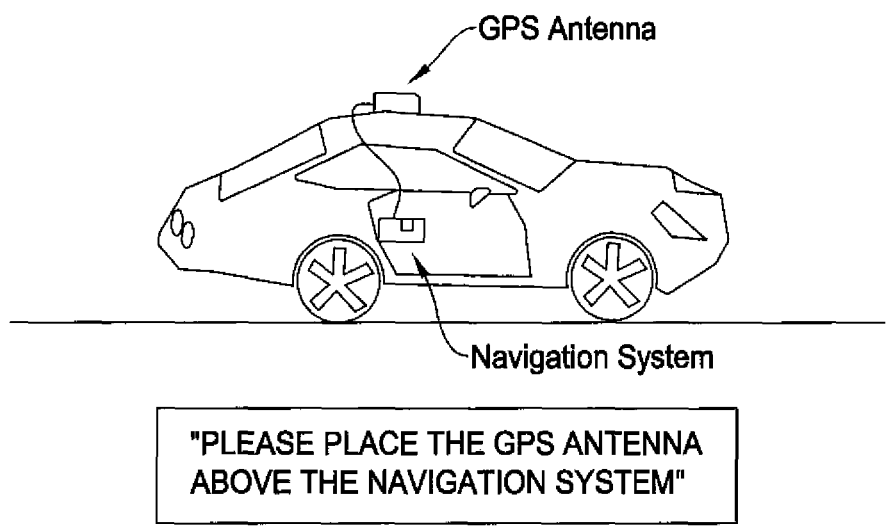
FIG. 20 shows an example of message to a user or an installer indicating to place the GPS antenna above the navigation system.

FIG. 19 shows a display image with the vehicle contour and navigation system's position with proper geometry between the vehicle contour and navigation system's position in which the distance between the navigation system and the rear wheel axis is automatically estimated by the method of present invention. Showing the vehicle contour with proper geometry with respect to the navigation system as well as to the objects surrounding the vehicle visually aids a driver's safety consciousness. The navigation system's absolute position (latitude and longitude) and map database are aligned by placing the GPS antenna above the navigation system. FIG. 20 shows an instruction to a user or an installer indicating to place the GPS antenna above the navigation system.

As has been described above, the embodiments of the integrated INS/GPS navigation system and method achieve the following advantageous effects: (1) regardless of the sensor position, the distance of the sensor position with respect to the rear wheel axis will be automatically estimated without need of measuring the distance by hand, which will be utilized to enhance navigation accuracy; (2) high positioning accuracy is maintained even when GPS signals are lost for a long period of time using a low-cost MEMS IMU; (3) the best sensor position to achieve the highest navigation accuracy is the center of the rear-wheel axis which is practically available by placing the sensor IMU at the bottom-center of the trunk of the vehicle; (4) the driver's safety consciousness is enhanced by the visual aid from the display showing the vehicle contour with proper geometry with respect to the navigation system as well as to the surrounding objects.

The detailed description in the foregoing is intended as a description on examples of apparatus, method, mathematical expressions, etc., in accordance with aspects of the present invention and is not intended to represent the only form in which the present invention may be prepared or utilized. Further, although the invention is described herein with reference to the preferred embodiments, one skilled in the art will readily appreciate that various modifications and variations may be made without departing from the spirit and scope of the present invention. Such modifications and variations are considered to be within the purview and scope of the appended claims and their equivalents. For example, the present invention can also be applied to the embodiments with a reduced-axis sensor configuration, such as one-axis accelerometer and one-axis tyro, and speed information obtained from vehicle's Controller-Area Network (CAN) bus.

What is claimed is:

1. An integrated INS/GPS navigation system for a vehicle to track a position of the vehicle, comprising:
    an inertial measurement unit (IMU) including micro-electro mechanical systems (MEMS) sensors configured to measure acceleration and angular rate of the vehicle;
    an inertial navigation system (INS) configured to produce vehicle's state estimates based on the acceleration and angular rate measurement from the IMU;
    an auxiliary measurement (Aux) unit configured to produce auxiliary measurement data involving an analytical condition derived from a vehicle's mechanical condition;
    a global positioning system (GPS) unit configured to receive GPS satellite signals from a plurality of GPS satellites via a GPS antenna to produce GPS measurement outputs indicating an absolute position and velocity of the vehicle;

a Kalman filter which combines the state estimates of the INS, the auxiliary measurement data of the Aux unit, and the GPS measurement outputs of the GPS unit and performs a Kalman filter processing thereon; and a display configured to visually produce the vehicle position derived from the position estimates by the INS and Kalman filter;

wherein the analytical condition incorporated in the Aux unit is represented by a first equation of "$0 = v_{by} - d\omega_{bz}$", where the first equation defines a relationship among "$V_{by}$" representing a vehicle's lateral directional velocity, "d" representing a distance between the MEMS sensors and a vehicle's rear wheel axis, and "$\omega_{bz}$" representing an angular rate with respect to a vehicle's z-axis, and wherein the distance "d" of the MEMS sensors from the rear wheel axis is incorporated into the state estimates of the INS and the Kalman filter processing as an auxiliary parameter so that the navigation system can automatically estimate the distance "d" between the MEMS sensors and the rear wheel axis by the Kalman filter processing based on the auxiliary measurement data "$z_1$" produced by the Aux unit as a second equation of "$z_1 = v_{by} - d\omega_{bz}$".

2. The integrated INS/GPS navigation system as defined in claim 1, wherein the Kalman filter continuously utilizes the analytical condition from the Aux unit as auxiliary measurement to calibrate the state estimates at a high frequency executed independently of the GPS measurement outputs.

3. The integrated INS/GPS navigation system as defined in claim 1, wherein the distance of the MEMS sensors from the rear wheel axis is set to zero by mounting the IMU at the point on the rear wheel axis thereby achieving the highest positioning accuracy.

4. The integrated INS/GPS navigation system as defined in claim 3, wherein the distance of the MEMS sensors from the rear wheel axis is set to zero by mounting the IMU at the bottom of a rear trunk of a vehicle which is approximately above the rear wheel axis for majority of vehicles.

5. The integrated INS/GPS navigation system as defined in claim 1, wherein the analytical condition is derived from a mechanical condition of the vehicle which is called Ackermann Steering Geometry.

6. The integrated INS/GPS navigation system as defined in claim 1, further comprising a navigation operation unit including a map database configured to implement an overall operation of the navigation system which specifies a destination, searches and calculates an optimum route to the destination, conducts the route guidance operation to the destination, wherein the navigation operation unit conducts a map matching process with respect to the position estimates from the INS and Kalman filter with position information retrieved from a map database.

7. The integrated INS/GPS navigation system as defined in claim 6, wherein the display shows a vehicle contour and navigation system's position with proper geometry between the vehicle contour and navigation system's position in which a distance between the navigation system and the rear wheel axis is automatically estimated, and wherein the navigation system's estimated absolute position (latitude, longitude, (and altitude if necessary)) and position information from the map database are aligned by placing the GPS antenna right above the navigation system.

8. The integrated INS/GPS navigation system as defined in claim 7, wherein the display shows the vehicle contour, navigation system's position with respect to the vehicle contour, and images of objects surrounding the vehicle, based on the map matching process of the navigation operation unit.

9. A computer-implemented method of an integrated INS/GPS navigation system for a vehicle to track a position of the vehicle, comprising the following steps of:

measuring acceleration and angular rate of the vehicle by using a processor in an inertial measurement unit (IMU) which includes micro-electro mechanical systems (MEMS) sensors;

producing vehicle's state estimates by an inertial navigation system (INS) based on the acceleration and angular rate measurement from the IMU;

producing auxiliary measurement data involving an analytical condition derived from a vehicle's mechanical condition by an auxiliary measurement (Aux) unit;

producing GPS measurement outputs indicating an absolute position and velocity of the vehicle by a global positioning system (GPS) unit which receives GPS satellite signals from a plurality of GPS satellites via a GPS antenna;

performing a Kalman filter processing by a Kalman filter on the state estimates of the INS, the auxiliary measurement data of the Aux unit, and the GPS measurement outputs of the GPS unit; and displaying a vehicle position derived from the position estimates by the INS and Kalman filter;

wherein the analytical condition incorporated in the Aux unit is represented by a first equation of "$0 = v_{by} - d\omega_{bz}$", where the first equation defines a relationship among "$v_{by}$" representing a vehicle's lateral directional velocity, "d" representing a distance between the MEMS sensors and a vehicle's rear wheel axis, and "$\omega_{bz}$" representing an angular rate with respect to a vehicle's zB axis, and wherein the distance "d" of the MEMS sensors from the rear wheel axis is incorporated into the state estimates and the INS in the Kalman filter processing as an auxiliary parameter so that the navigation system can automatically estimate the distance "d" between the MEMS sensors and the rear wheel axis by the Kalman filter processing based on the auxiliary measurement data "$z_1$" produced by the Aux unit as a second equation of "$z_1 = v_{by} - d\omega_{bz}$".

10. The method of the integrated INS/GPS navigation system as defined in claim 9, wherein the Kalman filter continuously utilizes the analytical condition from the Aux unit as auxiliary measurement to calibrate the position estimates at a high frequency executed independently of the GPS measurement outputs.

11. The method of the integrated INS/GPS navigation system as defined in claim 9, wherein the distance of the MEMS sensors from the rear wheel axis is set to zero by mounting the IMU on the rear wheel axis thereby achieving the highest positioning accuracy.

12. The method of the integrated INS/GPS navigation system as defined in claim 11, wherein the distance of the MEMS sensors from the rear wheel axis is set to zero by mounting the IMU at the bottom of a rear trunk of a vehicle which is approximately above the rear wheel axis for majority of vehicles.

13. The method of the integrated INS/GPS navigation system as defined in claim 9, wherein the analytical condition is derived from a mechanical condition of the vehicle which is called Ackermann Steering Geometry.

14. The method of the integrated INS/GPS navigation system as defined in claim 9, further comprising a step of implementing an overall operation of the navigation system for specifying a destination, searching and calculating an optimum route to the destination, conducting the route guidance operation to the destination, wherein the overall operation includes a step of conducting a map matching process with respect to the position estimates from the INS and Kalman filter with position information retrieved from a map database.

15. The method of the integrated INS/GPS navigation system as defined in claim 14, wherein the display shows a vehicle contour and navigation system's position with proper geometry between the vehicle contour and navigation system's position in which a distance between the navigation system and the rear wheel axis is automatically estimated, and wherein the navigation system's estimated absolute position (latitude, longitude, (and altitude if necessary)) and position information from the map database are aligned by placing the GPS antenna right above the navigation system.

16. The method of the integrated INS/GPS navigation system as defined in claim 15, wherein the display shows the vehicle contour, navigation system's position with respect to the vehicle contour, and images of objects surrounding the vehicle, based on the map matching process.

\* \* \* \* \*